(12) United States Patent
Leimbach

(10) Patent No.: US 12,468,580 B2
(45) Date of Patent: Nov. 11, 2025

(54) CLUSTER-WIDE VISIBLE WORK COORDINATION SYSTEM USING SYSTEM B-TREES

(71) Applicant: Dell Products L.P., Round Rock, TX (US)

(72) Inventor: David T. Leimbach, Mechanicsburg, PA (US)

(73) Assignee: DELL PRODUCTS L.P., Round Rock, TX (US)

( * ) Notice: Subject to any disclaimer, the term of this patent is extended or adjusted under 35 U.S.C. 154(b) by 498 days.

(21) Appl. No.: 18/173,888

(22) Filed: Feb. 24, 2023

(65) Prior Publication Data

US 2024/0289184 A1    Aug. 29, 2024

(51) Int. Cl.
| | |
|---|---|
| *G06F 9/46* | (2006.01) |
| *G06F 9/52* | (2006.01) |
| *G06F 16/22* | (2019.01) |
| *G06F 16/23* | (2019.01) |

(52) U.S. Cl.
CPC ............ *G06F 9/52* (2013.01); *G06F 16/2246* (2019.01); *G06F 16/2343* (2019.01)

(58) Field of Classification Search
CPC ..... G06F 9/52; G06F 16/2246; G06F 16/2343
See application file for complete search history.

(56) References Cited

PUBLICATIONS

Leimbach, "System B-Tree Change Notification System Using Lock Value Blocks," U.S. Appl. No. 17/812,472, filed Jul. 14, 2022.

*Primary Examiner* — Gregory A Kessler
(74) *Attorney, Agent, or Firm* — Amin, Turocy & Watson, LLP

(57) ABSTRACT

Technology described herein is related to work coordination through use of a system B-Tree system. An example method can comprise implementing, by a system comprising a processor, an exclusive lock in a lock domain that identifies a data structure representative of a system B-tree (SBT) of an SBT system, updating, by the system, an SBT generation number associated with the SBT, resulting in a first version of the SBT generation number, executing, by the system, in response to execution of a lock loss call back at the SBT, a comparison of the first version of the SBT generation number with a second version of the SBT generation number to determine a change of version of the SBT generation number, and identifying, by the system, a work assignment associated with the change of version of the SBT generation number.

20 Claims, 19 Drawing Sheets

1300

```
┌─────────────────────────────────────────────────────┐
│ IMPLEMENTING, BY A SYSTEM COMPRISING A PROCESSOR, AN │
│ EXCLUSIVE LOCK IN A LOCK DOMAIN THAT IDENTIFIES A DATA│
│ STRUCTURE REPRESENTATIVE OF A SYSTEM B-TREE (SBT) OF AN│
│ SBT SYSTEM. 1302                                     │
└─────────────────────────────────────────────────────┘
                           ↓
┌─────────────────────────────────────────────────────┐
│ UPDATING, BY THE SYSTEM, AN SBT GENERATION NUMBER   │
│ ASSOCIATED WITH THE SBT, RESULTING IN A FIRST VERSION OF THE│
│ SBT GENERATION NUMBER. 1304                         │
└─────────────────────────────────────────────────────┘
                           ↓
┌─────────────────────────────────────────────────────┐
│ UPDATING, BY THE SYSTEM, THE FIRST VERSION OF THE SBT│
│ GENERATION NUMBER TO THE SECOND VERSION OF THE SBT  │
│ GENERATION NUMBER IN RESPONSE TO INSERTION OF THE WORK│
│ ASSIGNMENT INTO THE DATA STRUCTURE REPRESENTATIVE OF THE│
│ SBT. 1306                                           │
└─────────────────────────────────────────────────────┘
                           ↓
┌─────────────────────────────────────────────────────┐
│ GENERATING, BY THE SYSTEM, A NOTIFICATION THAT THE WORK│
│ ASSIGNMENT HAS BEEN SELECTED FOR EXECUTION BY A CLAIMING│
│ ENTITY. 1308                                        │
└─────────────────────────────────────────────────────┘
                           ↓
┌─────────────────────────────────────────────────────┐
│ RELEASING, BY THE SYSTEM, AN EXCLUSIVE LOCK IN THE LOCK│
│ DOMAIN CAUSING THE EXECUTION OF THE LOCK LOSS CALL BACK AT│
│ THE SBT. 1310                                       │
└─────────────────────────────────────────────────────┘
                           ↓
┌─────────────────────────────────────────────────────┐
│ ENABLING SUBSCRIPTION, BY THE SYSTEM, BY A CLIENT ENTITY TO│
│ THE SBT. 1312                                       │
└─────────────────────────────────────────────────────┘
                           ↓
┌─────────────────────────────────────────────────────┐
│ ENABLING OBSERVATION, BY THE SYSTEM, BY THE CLIENT ENTITY OF│
│ THE DATA STRUCTURE REPRESENTATIVE OF THE SBT FOR ANY│
│ CHANGE OF VERSION OF THE SBT GENERATION NUMBER      │
│ ASSOCIATED WITH THE SBT. 1314                       │
└─────────────────────────────────────────────────────┘
                           ↓
┌─────────────────────────────────────────────────────┐
│ EXECUTING, BY THE SYSTEM, IN RESPONSE TO EXECUTION OF A│
│ LOCK LOSS CALL BACK AT THE SBT, A COMPARISON OF THE FIRST│
│ VERSION OF THE SBT GENERATION NUMBER WITH A SECOND  │
│ VERSION OF THE SBT GENERATION NUMBER TO DETERMINE A │
│ CHANGE OF VERSION OF THE SBT GENERATION NUMBER. 1316│
└─────────────────────────────────────────────────────┘
                           ↓
                          /A\
```

```
┌─────────────────────────────────────────────────────────────┐
│ OBTAINING INFORMATION ASSOCIATED WITH A WORK ASSIGNMENT THAT IS │
│              AVAILABLE FOR EXECUTION. 1502                   │
└─────────────────────────────────────────────────────────────┘
                              ↓
┌─────────────────────────────────────────────────────────────┐
│ WRITING DATA TO AN ENVELOPE OF A LEAF, OF A SYSTEM B-TREE (SBT) OF │
│ AN SBT SYSTEM, COMPRISING THE INFORMATION ASSOCIATED WITH THE │
│ WORK ASSIGNMENT, WHEREIN THE ENVELOPE IS COMPRISED BY A CACHE │
│ ASSOCIATED WITH THE LEAF, AND WHEREIN THE WRITING DATA TO THE │
│ ENVELOPE COMPRISES UPDATING AN SBT GENERATION NUMBER        │
│              ASSOCIATED WITH THE LEAF. 1504                  │
└─────────────────────────────────────────────────────────────┘
                              ↓
┌─────────────────────────────────────────────────────────────┐
│ WRITING THE DATA TO THE ENVELOPE COMPRISING WRITING THE DATA AS │
│                 A KEY/VALUE PAIR. 1506                       │
└─────────────────────────────────────────────────────────────┘
                              ↓
┌─────────────────────────────────────────────────────────────┐
│ WRITING THE DATA AS THE KEY/VALUE PAIR, WHEREIN HIGHER ORDER │
│ BYTES OF THE KEY/VALUE PAIR COMPRISE A DEVICE IDENTIFIER (ID) OF A │
│ NODE BEING ADDRESSED BY THE WORK ASSIGNMENT, AND WHEREIN    │
│ LOWER ORDER BYTES OF THE KEY/VALUE PAIR COMPRISE THE SBT    │
│              GENERATION NUMBER. 1508                         │
└─────────────────────────────────────────────────────────────┘
                              ↓
┌─────────────────────────────────────────────────────────────┐
│ GENERATING A NOTIFICATION THAT THE WORK ASSIGNMENT IS AVAILABLE. │
│                          1510                                │
└─────────────────────────────────────────────────────────────┘
                              ↓
┌─────────────────────────────────────────────────────────────┐
│ MONITORING THE SBT SYSTEM FOR CHANGES TO SBT GENERATION     │
│         NUMBERS ASSOCIATED WITH THE SBTS. 1512               │
└─────────────────────────────────────────────────────────────┘
                              ↓
┌─────────────────────────────────────────────────────────────┐
│ IDENTIFYING A CHANGE IN THE SBT GENERATION NUMBER OF THE SBT │
│              GENERATION NUMBERS. 1514                        │
└─────────────────────────────────────────────────────────────┘
                              ↓
┌─────────────────────────────────────────────────────────────┐
│        FLASHING A LOCK ASSOCIATED WITH THE LEAF. 1516        │
└─────────────────────────────────────────────────────────────┘
                              ↓
```

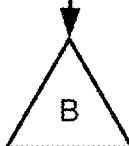

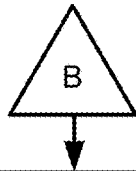

IN RESPONSE TO FLASHING THE LOCK, OBTAINING READ ACCESS TO THE LEAF. 1518

MAKING A CONFIGURATION CHANGE COMPRISING INDICATING, AT THE ENVELOPE, THAT THE WORK ASSIGNMENT HAS BEEN CLAIMED. 1520

MONITORING STATES OF WORK ASSIGNMENTS ASSOCIATED WITH THE SBT SYSTEM, COMPRISING THE WORK ASSIGNMENT. 1522

BASED ON THE MONITORING, GENERATING A LOG OF WORK ASSIGNMENTS, WHEREIN THE LOG IS ACCESSIBLE EXTERNAL TO THE SBT SYSTEM. 1524

FLASHING A LOCK ASSOCIATED WITH ONE OF THE SBTS THAT IS ASSOCIATED WITH A FAILED WORK ASSIGNMENT, OTHER THAN THE WORK ASSIGNMENT. 1526

MARKING THE FAILED WORK ASSIGNMENT AS EXPIRED AT A RESPECTIVE ENVELOPE OF THE ONE OF THE SBTS THAT IS ASSOCIATED WITH THE FAILED WORK ASSIGNMENT. 1528

```
┌─────────────────────────────────────────────────────────────┐
│ BASED ON A SUBSCRIPTION TO A SYSTEM B-TREE (SBT) OF AN SBT  │
│ SYSTEM, MONITORING THE SBT FOR A CHANGE TO A GENERATION     │
│ NUMBER ASSOCIATED WITH THE SBT. 1702                        │
└─────────────────────────────────────────────────────────────┘
                              ▼
┌─────────────────────────────────────────────────────────────┐
│ IN RESPONSE TO DETERMINING THAT THE CHANGE TO THE           │
│ GENERATION NUMBER ASSOCIATED WITH THE SBT HAS OCCURRED,     │
│ FLASHING A LOCK ASSOCIATED WITH THE SBT AND SUBSEQUENTLY    │
│ READING INFORMATION OF A KEY/VALUE PAIR ASSOCIATED WITH THE │
│ WORK ASSIGNMENT. 1704                                       │
└─────────────────────────────────────────────────────────────┘
                              ▼
┌─────────────────────────────────────────────────────────────┐
│ READING THE INFORMATION OF THE KEY/VALUE PAIR, WHEREIN      │
│ FIRST BYTES OF A FIRST ORDER OF THE KEY/VALUE PAIR COMPRISE │
│ A DEVICE ID OF A NODE BEING ADDRESSED BY THE WORK           │
│ ASSIGNMENT AND SECOND BYTES OF A SECOND ORDER OF THE KEY/   │
│ VALUE PAIR COMPRISE AN SBT GENERATION NUMBER OF THE SBT.    │
│ 1706                                                        │
└─────────────────────────────────────────────────────────────┘
                              ▼
┌─────────────────────────────────────────────────────────────┐
│ CACHING INFORMATION FROM THE SBT ASSOCIATED WITH THE        │
│ WORK ASSIGNMENT IN RESPONSE TO THE DETERMINING THAT THE     │
│ CHANGE TO THE GENERATION NUMBER ASSOCIATED WITH THE SBT     │
│ HAS OCCURRED. 1708                                          │
└─────────────────────────────────────────────────────────────┘
                              ▼
┌─────────────────────────────────────────────────────────────┐
│ ASSIGNING A WORK ASSIGNMENT TO A WORK NODE BASED ON         │
│ DETERMINING THAT THE CHANGE TO THE GENERATION NUMBER        │
│ ASSOCIATED WITH THE SBT HAS OCCURRED. 1710                  │
└─────────────────────────────────────────────────────────────┘
```

FIG. 17

CLUSTER-WIDE VISIBLE WORK COORDINATION SYSTEM USING SYSTEM B-TREES

BACKGROUND

Operating systems often employ the coordination of many processes that run in the background. Existing work coordination systems, for use by such operating systems, can be opaque and varied in their operation. As a result, processes such as work distribution, work assignment and work execution can be difficult to track, support and/or diagnose across two or more existing work coordination systems.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

Generally, provided is a framework for controlling and observing progress of work assignments from creation to completion, relative to a cluster of nodes to which the work assignments are applied, in a generalized way with logging for historical analysis. A controller, e.g., controller program, can serve as a single point of access to information to allow for both consistency and common ordering of the information.

An example method can comprise implementing, by a system comprising a processor, an exclusive lock in a lock domain that identifies a data structure representative of a system B-tree (SBT) of an SBT system; updating, by the system, an SBT generation number associated with the SBT, resulting in a first version of the SBT generation number; executing, by the system, in response to execution of a lock loss call back at the SBT, a comparison of the first version of the SBT generation number with a second version of the SBT generation number to determine a change of version of the SBT generation number; and identifying, by the system, a work assignment associated with the change of version of the SBT generation number.

An example system can comprise a processor, and a memory that stores executable instructions that, when executed by the processor, facilitate performance of operations, comprising obtaining information associated with a work assignment that is available for execution; writing data to an envelope of a leaf, of a system B-tree (SBT) of an SBT system, comprising the information associated with the work assignment, wherein the envelope is comprised by a cache associated with the leaf, and wherein the writing data to the envelope comprises updating an SBT generation number associated with the leaf; and generating a notification that the work assignment is available.

An example non-transitory computer-readable medium can comprise executable instructions that, when executed by a processor, can facilitate performance of operations. The operations can comprise, based on a subscription to a system B-tree (SBT) of an SBT system, monitoring the SBT for a change to a generation number associated with the SBT, and assigning a work assignment to a work node based on determining that the change to the generation number associated with the SBT has occurred.

An example advantage of one or more of the above-indicated method, system and/or non-transitory computer-readable medium can be an efficient ability to track newly available work assignments, claim available work assignments, and/or track progress of claimed work assignments. These operations can be facilitated by one or more aspects (e.g., a controller) of a single work assignment coordination system rather than through use of one or varied and more complex subsystems.

Another example advantage of one or more of the above-indicated method, system and/or non-transitory computer-readable medium can be an ability for entities external to the respective framework to request and to monitor subscriptions for various SBT system aspects (e.g., SBTs or leaves) of a related SBT system. This can allow for such entities to track progress of work assignments (e.g., including claiming work assignments) by use of the subscription implemented at the SBT and/or by taking a lock for an SBT. Notification can be provided by release of an exclusive lock by another entity and/or by monitoring, via the subscriptions, changes in SBT numbers of an SBT.

Yet another example advantage of one or more of the above-indicated method, system and/or non-transitory computer-readable medium can be the use of envelopes cached at the SBTs for storing and providing information on work assignments within the SBT system. That is, an envelope can be generated and data written to the envelope for one or more aspects (e.g., work assignments and/or leaves) of an SBT. Each envelope can comprise information about a corresponding work assignment which can be easily accessible by flashing a lock for the SBT related to the corresponding SBT aspect. Further, each envelope, of various envelopes at the corresponding SBT system, can have a common ordering and common information types, allowing for consistency and ease of access by a controller of the work coordination system.

Still another example advantage of one or more of the above-indicated method, system and/or non-transitory computer-readable medium can be use of a evaluator to update changes in work assignment statuses to the various envelopes of an SBT system. This evaluator can be an API of the controller. Use of the evaluator can provide a single agent of the framework to remove and/or otherwise clean up expired, completed and/or cancelled work assignment information at the envelopes.

Another example advantage of one or more of the above-indicated method, system and/or non-transitory computer-readable medium can be generation of one or more logs comprising the statuses and/or other information regarding the work assignments. A log can be stored external to the SBT system for access by various entities without knowing SBT generation numbers and without taking a lock for an SBT of the SBT system. In connection with the one or more envelope-based clean up actions that can be performed by the evaluator, the evaluator can generate and/or write to the log. By storing of the log external to the SBT system, the log can be more easily accessed, such as for troubleshooting purposes of one or more work assignments.

In one or more embodiments of the above-indicated method, system and/or non-transitory computer-readable medium, data corresponding to one or more work assignments can be written at the SBT system as a key/value pair. Higher order bytes of the key/value pair can comprise a device identifier (ID) of a node being addressed by the work assignment, and lower order bytes of the key/value pair can comprise the current SBT generation number associated with the work assignment. Use of the key/value pairs can allow for easy sorting and querying of the work assignments and related nodes being address by the work assignments.

BRIEF DESCRIPTION OF THE DRAWINGS

The technology described herein is illustrated by way of example and not limited in the accompanying figures in which like reference numerals indicate similar elements.

FIG. 13 illustrates a process flow diagram of a method of use of the work coordination system of FIG. 5, in accordance with one or more embodiments and/or implementations described herein.

FIG. 15 illustrates a process flow diagram of another method of use of the work coordination system of FIG. 5, in accordance with one or more embodiments and/or implementations described herein.

FIG. 16 illustrates a continuation of the process flow diagram of FIG. 15 of a method of use of the work coordination system of FIG. 5, in accordance with one or more embodiments and/or implementations described herein.

FIG. 17 illustrates a process flow diagram of yet another method of use of the work coordination system of FIG. 5, in accordance with one or more embodiments and/or implementations described herein.

DETAILED DESCRIPTION

Overview

Figure 1:
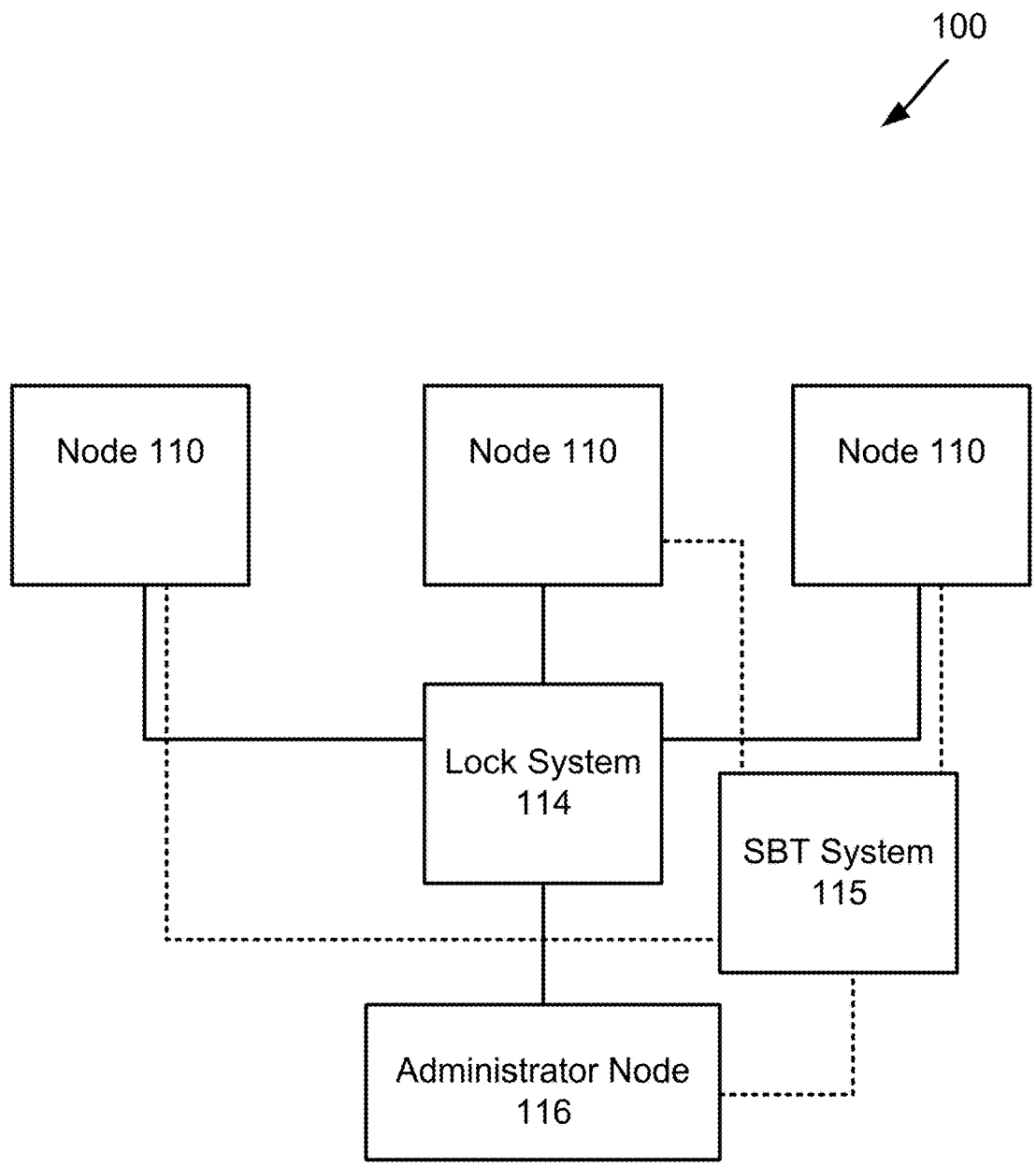
FIG. 1 illustrates a block diagram of a node system employing a lock system and a system B-Tree system, in accordance with one or more embodiments and/or implementations described herein.

The technology described herein is generally directed towards use of a shadow coordination and communication system, such as employing a lock domain or lock system, for communicating changes made to a system B-Tree (SBT) system, specifically relative to work coordination of one or more work assignments that are related to a cluster of nodes having device IDs (devIDs). This can be an efficient process, different from tracking of work assignments through various and disconnected systems, to generate notification of updates for work assignments, claiming of work assignments and/or clearing of work assignments (e.g., completing, cancelling and/or expiring work assignments).

That is, in existing frameworks, ability of non-experts (of existing work coordination systems) to diagnose problems can be based on deep knowledge of these systems' implementation. Specialized knowledge is needed for each system to arrive at even a basic understanding of a state of the system. As a result, observing the state of work assignments can be fraught with difficulty, that can saddle only those with adequate knowledge with the burden of responding to an abundance of work requests from various other entities (administrators, executives, clients, API's, etc.).

To make up for one or more of these deficiencies, disclosed is a system, method, framework and/or non-transitory computer-readable medium that can provide both consistency and ordering of work assignment data and progress updates, while allowing for generalized communication for queries relative to the work assignments. That is, queries relative to status, claiming work, submitting new work and/or the like can be directed to a single agent, such as a controller program, also herein referred to as a cluster coordination system (CCS), of a work coordination system, that can function in conjunction with an associated lock domain and system B-tree (SBT) domain. Obtaining of information relative to one or more work assignments can be generalized, absent unique knowledge of the implementation and/or inner-workings of the embodiments described herein, by use of a subscription system employing key/value pair data cached at the SBT domain. Further, control of background processes related to the work assignments can employ the same single agent resulting in a single agent to implement, assign, distribute, observe and/or evaluate the work assignments.

Generally, provided can be a work coordination system that can function to control various background processes related to work assignments that are directed to a cluster of nodes, where each node has a device ID. That is, the work assignments can be for performing work at and/or related to the nodes of the cluster.

In one example, the work coordination system can be employed by an upper level node, administrator node, work distribution node, and/or the like to communicate with (e.g., send instructions, work orders, and/or the like) sub-nodes (e.g., worker nodes, lower level nodes, and/or the like) regarding work assignments. Less disc input/output (I/O), processing power, memory, power, and other cost can be employed to facilitate the communicating as compared to existing processes, including existing polling processes.

As used herein, a "node" can refer to a computer that can be part of a cluster. The cluster can be and/or can comprise a group of nodes that can work cooperatively to implement a file system and/or other processes and/or system.

The work coordination system can generally employ both a lock domain and a system B-tree (SBT) domain to facilitate the control of the various background processes related to the aforementioned work assignments. A lock domain can comprise a lock system, and an SBT domain can comprise an SBT system.

Generally, the lock domain can be employed to implement one or more locks for the SBT domain, with the locks being employed for access to and notification regarding one or more data caches at the SBT system. That is, the lock system can employ lock value blocks, lock loss callbacks, and in one or more embodiments, an event subsystem. As a result, reduction can be provided for an overall number of read requests for utilizing SBTs by providing a node-local event stream to notify interested threads when it is time to look for changes in SBTs. In connection therewith, the aforementioned controller of the work coordination system can use this event stream to coordinate control and observation of processes associated with the work assignments. These processes can be considered background processes relative to other work coordination systems but are notably up-front processes relative to the SBT system, lock system and work coordination system that are functioning together based on orchestration by the work coordination system.

As used herein, a "client," also herein referred to as a "client entity," can be a sub-node, node, worker node, customer, administrating entity and/or service manager.

As used herein, the term "cost" can refer to power, money, memory, processing power and/or the like.

As used herein, the term "entity" can refer to a machine, device, smart device, component, hardware, software and/or human.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, the term "resource" can refer to power, money, memory, processing power and/or the like.

Example Architectures

Generally provided can be a work distribution system that can employ a lock system and a corresponding SBT system to facilitate observation, distribution and/or other processes related to one or more work assignments for execution of work at a cluster of nodes.

The cluster can be and/or can comprise a group of nodes that can work cooperatively to implement a file system and/or other processes and/or system. Each node can comprise a unique device ID (devID).

Regarding the lock system, locks taken at the SBT system can carry additional value data known as lock value blocks (LVB). Further, the lock system can be configured to specify which lock types are compatible (can be taken by multiple owners simultaneously in the cluster), and which ones can grant the rights to either read or write LVBs, such as exclusive locks.

The lock system can be a two-tiered locking system. Each node of the aforementioned cluster, and/or a controller of a work coordination system described herein, can coordinate cluster-wide resource lock ownership for a given resource within a lock domain. The lock system can have per-node initiators which can work with coordinators to determine node-level lock ownership. Threads can be granted locks based on local node initiator ownership. When all of the threads on a given node unlock a resource, that lock can still be held at the initiator for efficiency reasons. This can be referred to as a "lazily held lock".

Operationally, when a lock coordinator receives a request for a lock that is incompatible with existing held locks, the lock coordinator can communicate with the initiators that own incompatible locks to release them. If those locks are lazily held, the initiator can release the lock back to the coordinator. The lock system can provide an interface by which a node can trigger functions to run when a lock is released to the coordinator called a lock loss callback. Lock loss callbacks (LLCBs) can be used to inform other parts of the local node, the cluster, or subscribers that an assumption guarded by the lock is now invalid, such as a cache. It is noted that a lock does not need to be held by any thread on the node to maintain a cache of data associated with such a lock.

The lock domain's compatibility table can be such that only one exclusive owner can exist at a time and such that the exclusive owner is the only one allowed to update the associated LVB entry at a given time.

The SBT system is generally a fast key/value storage system. A single SBT contains a set of keys and associated values at various aspects of the SBT, such as leaves. Each SBT represents a single topic, such as a type of work or particular node of a cluster of one or more nodes served by the work coordination system. Put another way, a topic can be a place for work producers, observers, and/or work consumers (e.g., all entities as described herein) to rendezvous, particularly relative to work assignments for the cluster. Each topic can be globally visible in the respective cluster. As such, the topic can be defined as a workspace applied to the statuses of work assignments (new, subscribed, claimed, cancelled, completed, collected), realized as arguments to application programming interface (API) calls in a respective client library of the work coordination system.

An SBT can be iterated or searched using range queries across the key space. The SBTs can be used for configuration and/or statistical data as well as for producer and/or consumer work queues of work assignments and associated data. Such data, including the key/value pairs can be stored at caches of the SBT, which caches can comprise envelopes.

Also provided can be an event system. An event can provide an interface for subscribing to and receiving events at either cluster-wide or node-local scope. A widely used event producer/consumer of this system can be a good manufacturing practice (gmp) system, which can inform key services when drives or nodes change states that require automatic and background level action. This can include, for example, a change to data written to an envelope of an SBT, change to an SBT generation number, or the like.

By creating a new lock domain with resources that identify different SBTs, global cached generation numbers (SBT generation numbers) for that SBT space can be generated and changes communicated via LVBs.

An SBT generation number can be similar to a version number or a counter. Each node can maintain a respective version of the state of the environment, per the last time the respective environment was read, as such version number. A node can execute a comparison of what was last read versus what is currently at the environment to establish a steady state. Thus, the SBT generation number can serve as a cache invalidation mechanism where the cache is valid as long as the SBT generation number remains the same.

Indeed, by creating a lock domain with resources based on keys within a given SBT, threads can subscribe to individual keys of interest and receive notifications similarly. The SBT needs a value structure (e.g., respective key/value pairs) in which the blobs associated with the keys contain the generation number for the key to be used as the above processes. By making a modification to the way consumers subscribe to events, one or more frameworks discussed herein can change the granularity of a subscriber to individual SBT entries.

For example, relative to the SBT generation number, LVB generation number and lock system discussed above, a lock loss callback (LLCB) can provide an event and/or notification to one or more nodes to go back and re-read the SBT current generation number, employed as a LVB generation number, to determine if a change has been implemented for the SBT system.

With all of those components in place, the SBT generation number (which is the authoritative source of truth for the "version" of the SBT state), the Lock Value Block copy of it, which is used to establish the cache across all nodes in parallel with shared locks (as long as there is no exclusive locker holding an exclusive lock), and the ability to trigger lock loss callbacks when an exclusive locker updates the Lock Value Block (LVB) generation number can, in combination, provide a framework for a cache invalidation/change notification system, and can facilitate avoidance of polling the SBTs in order to keep the nodes up-to-date.

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the computing environment 1900 illustrated at FIG. 19. In one or more described embodiments, computer and/or computing-based elements can be used in connection with implementing one or more of the systems, devices, components and/or computer-implemented operations shown and/or described in connection with FIGS. 1-16 and/or with other figures described herein.

Turning first to FIG. 1, an exemplary node system, such as multi-node system 100, is illustrated that can employ a lock system 114 to communicate changes to a system B-Tree (SBT) system 115. The multi-node system 100 can represent a single cluster and can comprise an administrator node 116 and a plurality of nodes 110. Each of the administrator node 116 and nodes 110 can be coupled to, and/or couplable too, the lock system 114 and the SBT system 115, such as for communication there-amongst. A connection can exist between the lock system 114 and the SBT system 115.

Figure 2:
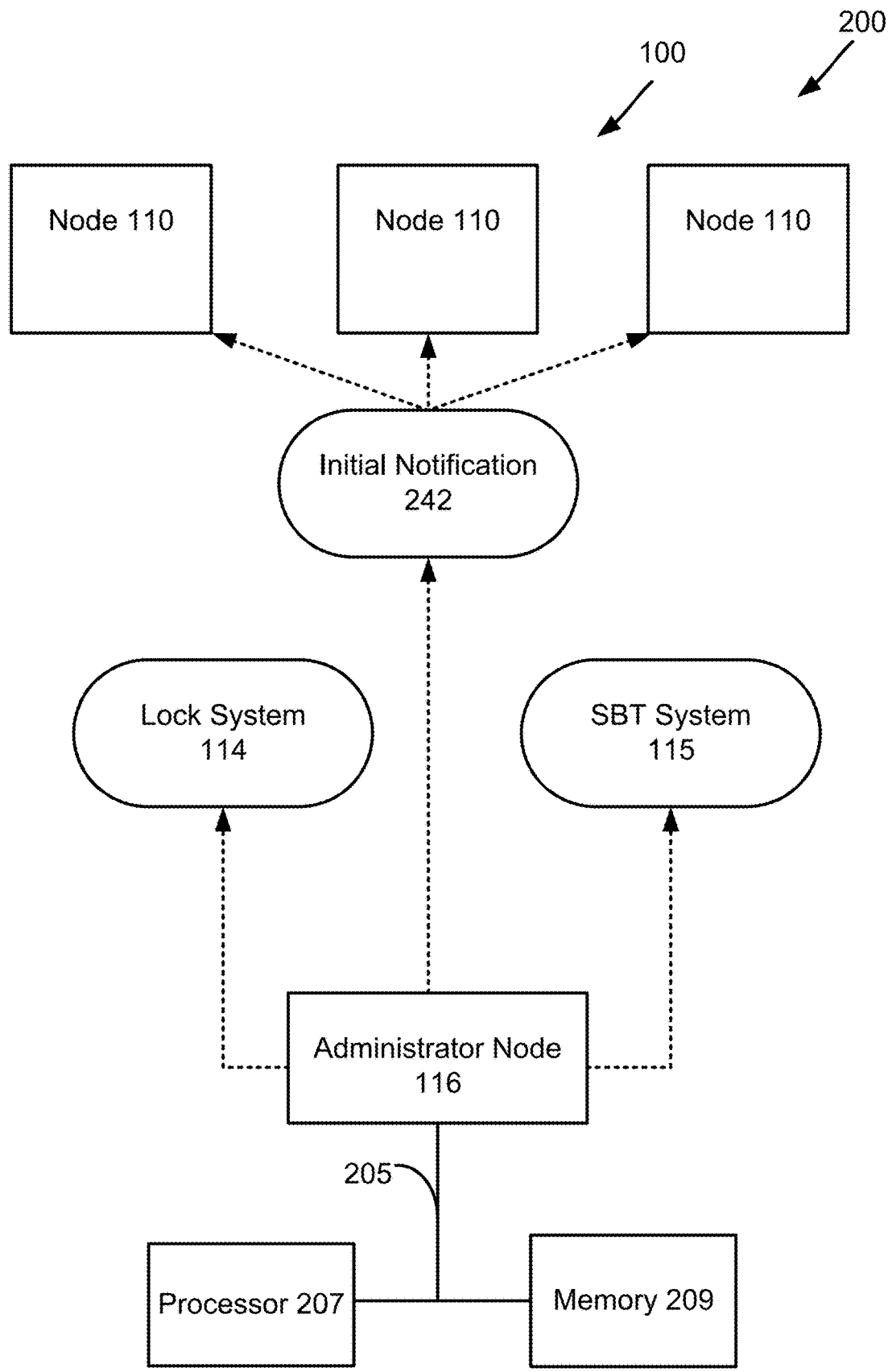
FIG. 2 illustrates another block diagram of a node system employing a lock domain, corresponding to a lock system, and a system B-Tree system, in accordance with one or more embodiments and/or implementations described herein.

Turning next to FIG. 2, a partial schematic 200 of the multi-node system 100 of FIG. 1 is depicted, illustrating aspects of the system relative to the administrator node 116. While referring here to one or more processes, operations, facilitations and/or uses of the non-limiting system 200, description provided herein, above and/or below also can be relevant to one or more other non-limiting system architectures described herein. Repetitive description of like elements and/or processes employed in respective embodiments is omitted for sake of brevity.

Generally, the multi-node system 100 can comprise any suitable computing devices, hardware, software, operating systems, drivers and/or network interfaces. For example, the administrator node 116 can be coupled to a suitable processor 207 and memory 209 by a bus 205.

Communication among the illustrated nodes 110 and the lock system 114 and/or SBT system 115, and/or among the administrator node 116 the lock system 114 and/or SBT system 115, can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the multi-node system 100.

In one or more embodiments, the multi-node system 100 can comprise a processor 207 (e.g., computer processing unit, microprocessor, classical processor and/or like processor). In one or more embodiments, a component associated with multi-node system 100, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s).

In one or more embodiments, the multi-node system 100 can comprise a machine-readable memory 209 that can be operably connected to the processor 207. The memory 209 can store computer-executable instructions that, upon execution by the processor 207, can cause the processor 207 and/or one or more other components of the multi-node system 100 to perform one or more actions. In one or more embodiments, the memory 209 can store computer-executable components.

The multi-node system 100 and/or a component thereof as described herein, can be communicatively, electrically, operatively, optically and/or otherwise coupled to one another via a bus 205 to perform functions of non-limiting system architecture 200, multi-node system 100 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, multi-node system 100 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the multi-node system 100 can reside in the cloud, and/or can reside locally in a local computing environment (e.g., at a specified location(s)).

In addition to the processor 207 and/or memory 209 described above, multi-node system 100 can comprise one or more computer and/or machine readable, writable and/or executable components and/or instructions that, when executed by processor 207, can facilitate performance of one or more operations defined by such component(s) and/or instruction(s).

Referring still to FIG. 2, an administrator node 116, e.g., employing a work coordination system as described herein below, can configure or request configuration of the lock system 114 that will be used by the administrator node 116/work coordination system to communicate changes to the SBT system 115. For example, changes to the SBT system 115 can comprise change to, such as incrementing, a SBT generation number.

Use of the lock system 114 for this/these SBT purpose(s) can be communicated to the nodes 110 of the multi-node system 100 by any suitable means, such as by the administrator node 116, work coordination system, processor 207 and/or any other suitable component issuing and/or otherwise generating an initial notification 242. As such, the nodes 110 can be configured to recognize that notifications relative to the lock system 114 can indicate a possible change to the SBT system 115.

Figure 3:
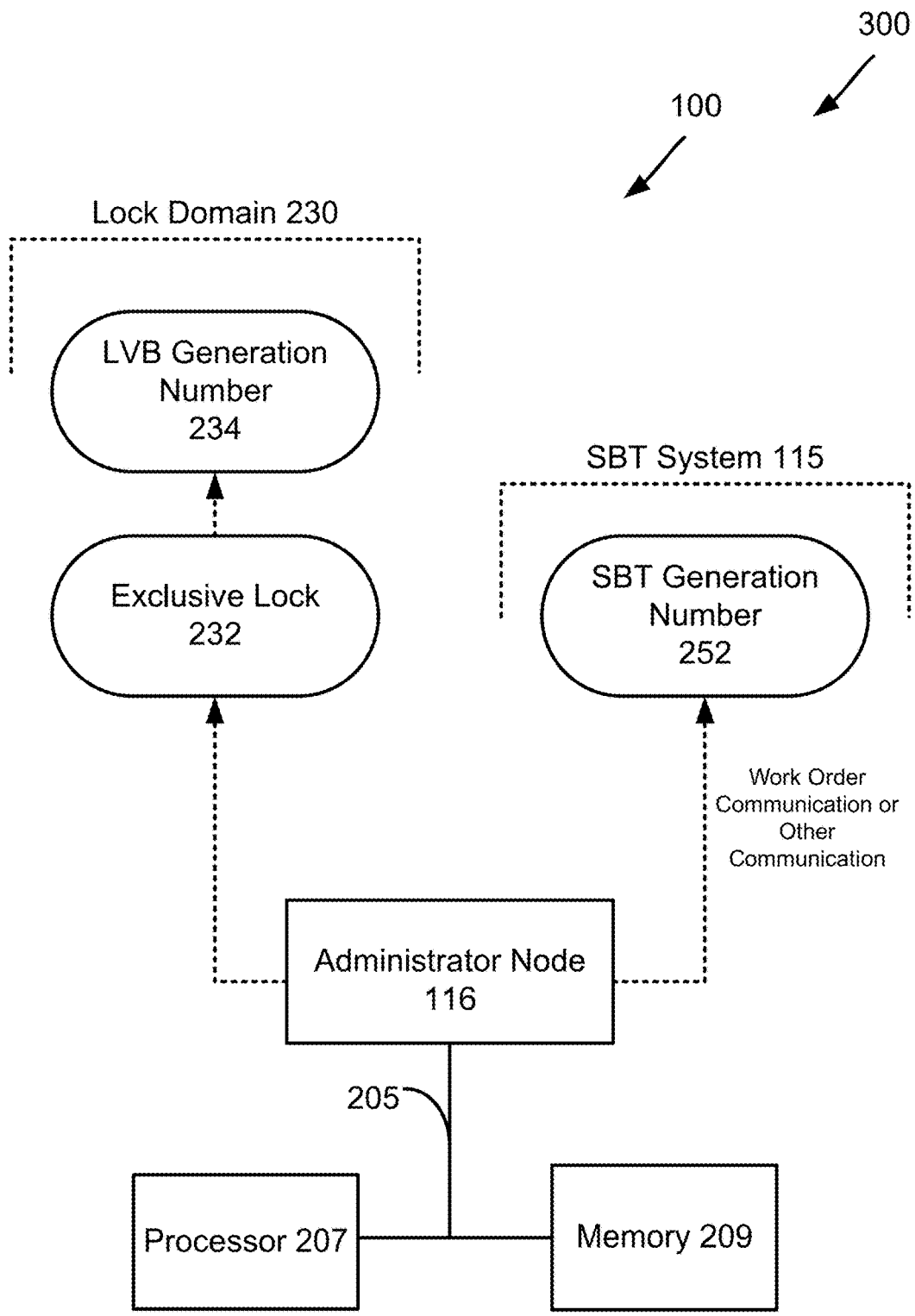
FIG. 3 illustrates another view of the block diagram of FIG. 2, in accordance with one or more embodiments and/or implementations described herein.
Figure 4:
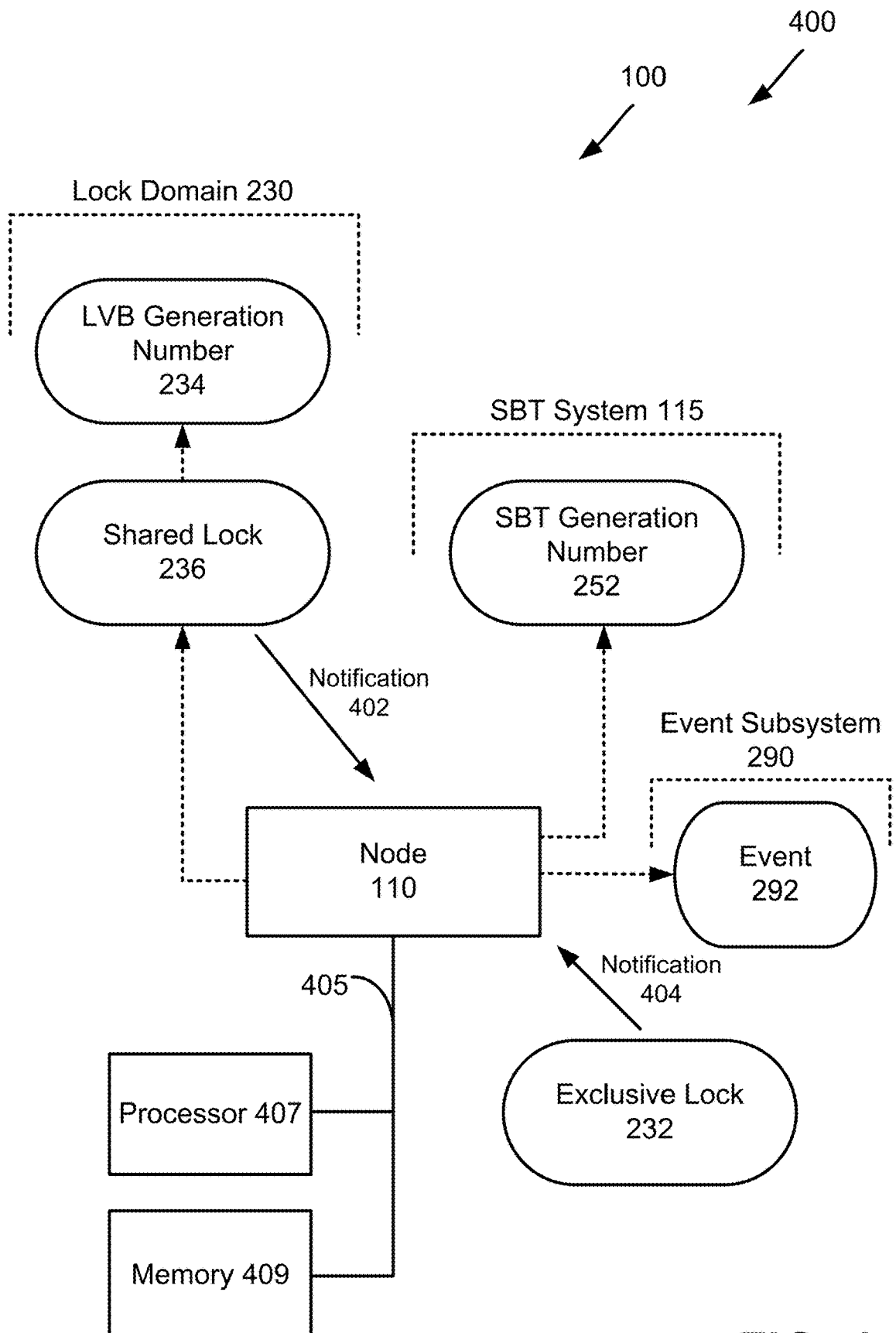
FIG. 4 illustrates yet another block diagram of a node system employing a lock domain and a system B-Tree system, in accordance with one or more embodiments and/or implementations described herein.
Figure 5:
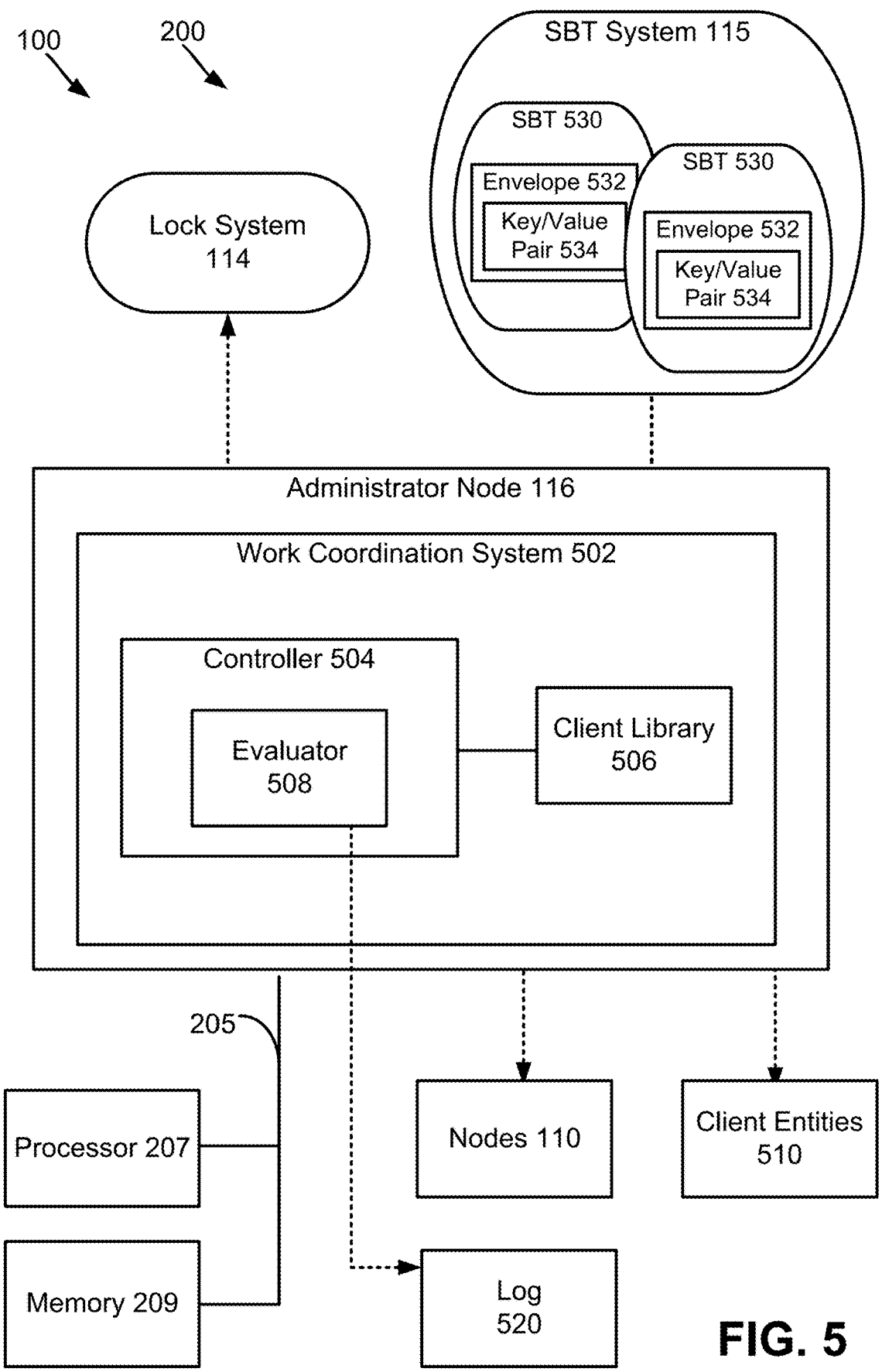
FIG. 5 illustrates a block diagram of a work coordination system employing a lock domain and a system B-Tree system to coordinate work assignments, in accordance with one or more embodiments and/or implementations described herein.

Discussion turns next to FIGS. 3 to 5. Relative to FIG. 3, first described is general cooperative functioning among the administrator node 116, the lock system 114 and the SBT system 115. Relative to FIG. 4, described is general cooperative function among a node 110, the lock system 114 and the SBT system 115. Thereafter, relative to FIG. 5, described in detail is a work coordination system 502, in accordance with one or more embodiments herein, that can be employed by the administrator node 116 to control, direct and/or observe various processes related to work coordination while cooperatively using the lock system 114 and the SBT system 115.

That is, turning first to FIG. 3, the administrator node 116 can generally make a change and/or update to the SBT system 115, such as updating and/or otherwise incrementing an SBT generation number 252 associated with the SBT system 115. For example, the administrator node 116 can employ a work coordination system 502 (FIG. 5), to be further described herein in detail relative to FIGS. 5 to 16.

To communicate the change to the SBT system 115 that was made by the administrator node 116 (and/or by another node), the administrator node 116 can generally request, and the lock system 114 can implement, an exclusive lock 232 for the administrator node 116 in the lock domain 230. In this way, the administrator node 116 can update, such as increment an LVB generation number 234 and SBT generation number 252. The LVB generation number 234 can be identical to the updated SBT generation number 252 and/or otherwise have a correspondence to the SBT generation number 252. In one or more embodiments, the LVB generation number can be but a copy of the SBT generation number 252. In this way, a node 110 reading the LVB generation number 234/SBT generation number 252 can determine, utilize and/or otherwise be informed, based on the LVB generation number 234/SBT generation number 242, that a change to a particular SBT generation number 252, and/or more generally, a change to the SBT system 115, has been implemented.

For example, the LVB generation number 234/SBT generation number 252 read by the node 110 can be compared to an LVB generation number/SBT generation number previously cached by the node 110. Where changes are indicated, such as where the LVB generation numbers/SBT generation numbers do not match, the node 110 can be triggered to access the SBT system 115.

Turning now to FIG. 4, in addition to FIG. 3, in response to implementation of the exclusive lock 232 for the administrator node 116, any other node (e.g., nodes 110) having a shared lock in the lock domain 230 (e.g., hard shared lock and/or lazily-held shared lock) will be requested to release the shared lock and/or the shared lock will be released automatically. That is, a lock loss callback will be initiated. In response to this lock loss callback, and/or in response to the exclusive lock being implemented and/or requested, a notification (e.g., notification 404 of FIG. 4) can be generated comprising an indication of a known change and/or possible change to the SBT system 115. That is, a change to a lock in the lock domain 230 can cause generation of the notification. The notification can act as a trigger to access the SBT system 115.

The notification 404 can indicate a possible change where an SBT system 115 has not yet been updated and will be at least partially updated corresponding to access to the lock domain 130 by the administrator node 116. The notification 404 can indicate a known change where the SBT system 115 has already been updated at least partially prior to and/or during access to the lock domain 230 by the administrator node. That is, any of the notification generation, SBT generation number incrementation and/or LVB generation number incrementation can take place in different orders and/or at least partially at a same time as one another.

In response to receipt of the notification, and/or in response to requesting and/or receiving implementation of a shared lock 236 in the lock domain 230 for any other purpose, the node 110 can receive a respective notification. That is, even if the node 110 does not receive the notification 402, access to the lock domain 230, such as by requesting and/or receiving a shared lock 236 can differently allow the node 110 to receive indication of a known or possible change to the SBT system 115 (e.g., by the notification 402).

In one or more embodiments, a notification (e.g., notification 242, 402 and/or 404) can be comprised by and/or be an event, such as of an event subsystem (e.g., event subsystem 290) coupled to and/or comprised by the multi-node system 100. That is, the lock system 114 can employ the event subsystem 290, in one or more embodiments, to generate and/or otherwise broadcast the notifications (e.g., events) to specified users (e.g., nodes).

To determine whether the SBT system 115 should be accessed, the node 110 can read the SBT generation number 252 at the SBT system 115, such as by querying the SBT system 115. The SBT generation numbers cached by the node 110 can be compared to those received in response to a query. Where comparison is successful, such as where the generation numbers match and/or otherwise correspond, a steady state can be maintained by the node 110. Where comparison is not successful, such as where the generation numbers compared do not match and/or otherwise do not correspond, such can act as a trigger to the node 110 (e.g., the node 110 can be triggered) to access the SBT system 115 and to determine an update thereto. In response, a shared lock 236 can be flashed for a quick read of any information cached at the SBT system 115. That is, the shared lock 236 can be released shortly after its implementation.

In one or more embodiments, where one node 110 is triggered that an SBT generation number is outdated, that node 110 can trigger and/or otherwise request a notification to one or more other nodes 110 that the SBT generation number is outdated. For example, the one node 110 can request and/or otherwise cause issuance of an event 292 by an event subsystem 290. The event 292 can be broadcast to a specified set of nodes, such as a set of nodes that employ the lock domain 230.

Still looking to FIG. 4, it will be appreciated that the node 110 can have coupled thereto a processor 407 and memory 409 by a bus 405. Description above of the processor 207, memory 209 and bus 205 apply respectively to the processor 407, memory 409 and bus 405. Additionally and/or alternatively, the node 110 can be coupled to the processor 207, memory 209 and/or bus 205.

Referring to FIGS. 1-4 in combination, it is appreciated that any one or more of the processes afore described can be performed at scale. For example, any one or more nodes 110 can at least partially at the same time have a shared lock implemented in the lock domain 230. In an example, more than one SBT update can be communicated at least partially at the same time by the administrator node 116, such as by a same exclusive lock and/or subsequent exclusive locks.

Turning now to FIG. 5, a work coordination system 502 is described that can employ the lock system 114, SBT system 115 and event subsystem 290 to facilitate coordination, direction and/or observation relative to one or more work assignments that are related to the cluster of the nodes 110.

As illustrated at FIG. 5, the administrator node 116 can comprise the work coordination system 502. In one or more other embodiments, the work coordination system 502 can be employed by but exist separately from the administrator node 116. The work coordination system 502 can comprise a controller 504 (also herein referred to as a cluster coordination system or CCS), a client library 506 and a utility program (also referred to herein as an evaluator, collector and/or reaper). As illustrated, the evaluator 508 can be comprised by the controller 504. In one or more other embodiments, the evaluator 508 can be a program separate from the work coordination system 502. As illustrated, the work coordination system 502 generally can employ the processor 207, memory 208 and/or bus 205.

Turning first to the client library 506, this library can be and/or can be comprised by an application programming interface (API) that can be consumed by one or more client entities using the work coordination system 502.

Turning next to the controller 504, use of the controller 504 as a single point of access (or single agent for access) to the SBT system 115 and the lock system 114 can allow for consistency and ordering of data related to one or more work assignments that is written to and stored at caches of the SBT system 115. That is, the controller 504 generally facilitates subscriptions, communications regarding work assignments, work assignment encoding, and/or addressing of work assignment communications to client entities 510 (including sending of SBT generation numbers). These client entities 510 can be observing a work assignment, performing a work assignment, having a work assignment performed thereon, and/or troubleshooting a work assignment. The client entities 510 can be work assignment consumers, work assignment producers and/or work assignment observers. The work assignments can be requested and performed for the multi-node cluster of the nodes 110, and thus the SBT system 115 can be, in one or more embodiments, aligned solely with a discrete set of nodes, such as a single cluster of nodes 110.

The controller 504 can store work assignment-related data at one or more caches of the SBT system 115 using key/value pairs and other cache entries. A key/value pair 534 can be employed per work assignment, with each SBT 530 comprising one or more key/value pairs 534. In one or more embodiments, higher order bytes of a key/value pair 534 can comprise a devID of a node to be addressed/serviced by a work assignment. Lower order bytes of the key/value pair 534 can comprise an entry that can track work assignments themselves. For example, the lower order bytes can comprise at least an SBT generation number, which SBT generation number can be updated by the controller 504 upon writing of a status or updating of a status of a work assignment. That is, the lower order bytes can be employed as a notification system to subscribers of the SBT that a change to data relative to a work assignment has been made.

Stated another way, a key is 128 bits split into two 64-bit components. The higher order bytes contain the device id of the node being addressed or 0 for a work assignment being addressed generally to the cluster (any node can pick up work for device ID zero). The lower order bytes contain a generation number for the SBT tree itself at the time the work assignment was submitted. This arrangement is meant to facilitate efficient range queries by the controller 504 and to help find the oldest work first (e.g., in a first in, first out manner). The most recent generation number is a value in a respective SBT that is keyed by the device id for work assignment being submitted. For example, an SBT for a 5-node cluster could have six generation numbers present in the SBT, including one for each device/node in the cluster plus one for the cluster itself (devID 0).

As noted above, this use of key/value pairs 534 can allow for efficient querying of the SBT system 115 relative to node devIDs and/or relative to SBT generation numbers. This querying can be performed without any need to request a lock relative to the SBT system 115.

Additionally, work assignments (e.g., work items) in the SBTs can have a common envelope 532 that can enable a generic tool (e.g., utility program) to examine the state of various outstanding or completed work in any of the topics utilized in this system. In one or more embodiments, an envelope 532 can comprise one or more of the key/value pairs 534. In one or more embodiments, each work assignment, and thus each leaf of an SBT 530, can comprise an envelope or have associated therewith an envelope. In one or more other embodiments, a common envelope can be employed for each SBT 530. This utility program, which can be the client library 506, can be comprised by the library 506, and/or can employ the client library 506, does not need to communicate with the controller's inter-process communication (IPC) mechanism to work. In one or more embodiments, the utility program can link at least a subset of common code employed to build the controller 504 (CCS). The utility program can iterate and parse the envelopes in a given topic SBT. This utility program can have all of its business logic provided in a library that can be useful for engineers writing test code for participating subsystems.

The values associated with work keys can encode the common envelope first in the payload. The envelope can include the deadline and the current state of the work assignment, detailed below. Next the value can comprise a length and bytes which have meaning to the service consuming the work item. This area can be opaque to the controller 504 but can be meaningful to worker entities operating within the respective SBT's topic.

The aforementioned writing and/or storage processes can be performed by the controller 504 relative to one or more work assignments having varied statuses (also herein referred to as states), such as unclaimed, claimed, expired, or one of the various completed status types of success, failure, or cancelled. For example, a client entity, such as a command line utility program/application/API or service manager program/application/API, can make a request that a new work assignment (also herein referred to as new work or work) be made available at the SBT. It is noted that a work assignment that is in the expired state can still be moved to a completion state if the evaluator 508 has not yet collected it. A work assignment that is cancelled can still be being executed by a service entity, but the client can have determined that it no longer requires completion of the work assignment. A work assignment that is updated to a state of cancelled is not further updated to a state of success or failure. However, information regarding execution or even completion of execution can be written to a log 520 by the evaluator 508, as will be described below in detail. A success or failure state can each respectively carry a message in the form of a short string.

It is noted that the controller 504 can perform one or more queries, taking of locks, writing of data to an envelope and/or the like at a same time as any one or more of these processes. That is, function of the controller 504 can be scaled.

Next, the evaluator 508 can operate to update statuses (e.g., available, new, claimed, expired, completed) of work assignments at various envelopes of the SBT system 115 by updating data at the SBT system 115 that is representative of the statuses. This updating can be performed upon demand, and/or at any determined interval, thus causing the controller 504 and/or the evaluator 508 to walk the SBT for the provided topic. The evaluator 508 can generally update statuses as completed (work assignment finished, work assignment errored, work assignment failed or work assignment cancelled) and/or expired. The evaluator 508, or the controller 504 assisting the evaluator 508, can observe expiration data at the SBT system 115 that is indicative of expiration of work assignment requests.

Where a work assignment request is expired, the evaluator 508 can update the associated status as expired and/or update the expiration, such as where trigger data related to the expiration data indicates that an expiration should be updated upon expiring of the respective work assignment request.

In any of the above cases, the evaluator 508 can further generate and/or write to a log 520 that can be accessed external to the SBT system 115 by a client entity. The log can comprise data related to completion (e.g., closing of work, cancelation of work and/or expiration of work), which data can be written by the evaluator 508. For example, the log can comprise the message carried by the success state or failure state. In another example, the log can comprise information regarding execution/stopped execution/completion of cancelled work assignment, and/or information generally regarding outcome of execution of the work assignment. The log data further can comprise any additional supporting data, such as including, but not limited to, time data, telemetry data, time to completion data, resource use data, failure reasoning data, error reasoning data, and/or the like. That is, without accessing the SBT system 115 and without requiring a subscription to an SBT of the SBT system 115, a client entity, such as a quality control entity or other troubleshooting entity, can access the log 520 to gather information regarding progress of one or more work assignments.

This log 520 in itself can provide a single point of access to information for troubleshooting work assignments that are controlled and observed by the work coordination system 502. That is, the generation and updating of the log 520 by the evaluator 508, and thus by the controller 504, can account for a deficiency of existing frameworks requiring exclusive access to existing work coordination systems or unique expertise for successfully and/or efficiently accessing existing work coordination systems. Instead, the work coordination system 502 can provide a single point of access, the log 520, for gaining post-completed work assignment information absent the need for such unique expertise or exclusive access.

It is noted that where reference is made to "work" without being followed by "assignment" or a conjugation thereof, the term "work" refers to one or more "work assignments."

Example Operations

While the above description relative to FIG. 5 provides a brief overview of the elements of the work coordination system 502, and indeed provides only a brief synopsis of functioning of the controller 504, detailed process illustrations at FIGS. 6 to 12 and corresponding description together provide for a more detailed explanation of the various processes carried out by the work coordination system, along with explanation and illustration of interaction of the various elements of the work coordination system 502 with the lock system 114, SBT system 115 and client entities 510.

It is noted that while the work coordination system 502 further can interact with the event subsystem 290 for sending/receiving of communications and/or subscriptions, this mechanic is not illustrated in detail for sake of brevity. In one or more embodiments, such event subsystem even can be comprised by the work coordination system 502.

Figure 6:
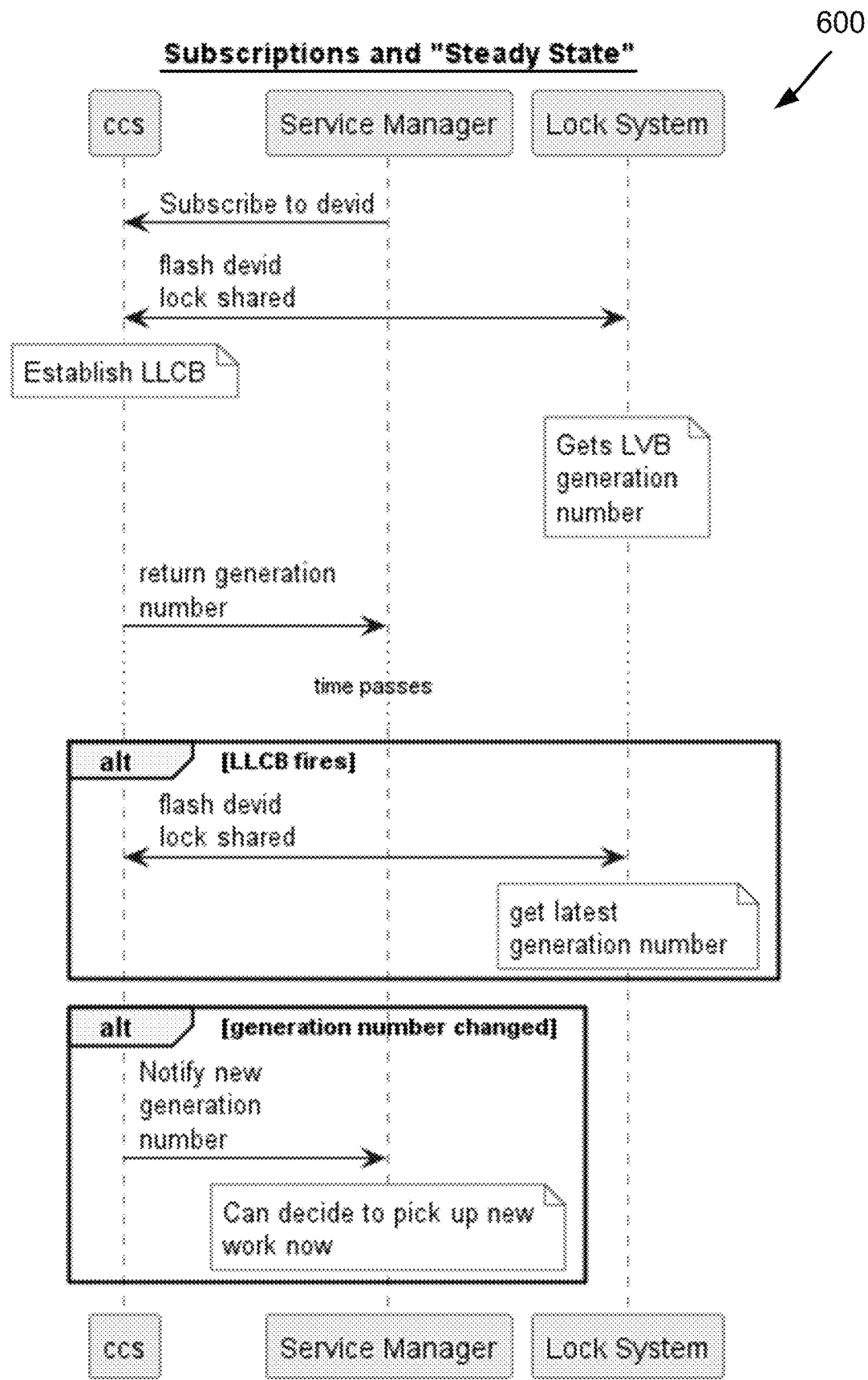
FIG. 6 illustrates a process flow diagram of one or more processes performed by the work coordination system of FIG. 5, in accordance with one or more embodiments and/or implementations described herein.

Turning first to the subscription process facilitated by the controller 504, FIG. 6 provides a process sequence illustration 600 including a steady state and a request for subscription to the SBT system 115. Elements illustrated include the controller 504 (CCS), a service manager (client entity) and the lock system 114.

Subscriptions can be implemented by a sequence of maintaining (e.g., reading, updating and writing) the SBT generation number for the devID being subscribed to, as well as by maintaining a lock value block associated with the devID itself. These resources can exist in a lock domain created just for use with the controller 504, per-topic SBTs. The resource for the lock operation can be a hash of the topic and the devID. By flashing (e.g., locking and then unlocking) a shared lock on a given resource, an entity can read the lock value block associated with that topic/devID pair, giving the latest SBT generation number. The controller 504 can compare this SBT generation number to the last one cached and determine if there has been a change in the SBT space. These processes can enable the controller 504 to supply notifications to subscriber entities, such as the illustrated service manager entity.

To provide a more in depth description of FIG. 6 and the processes illustrated therein, a service manager entity can subscribe to one or more devIDs by sending a message to the controller 504. The controller 504 can then operate to establish a steady state by flashing various locks corresponding to the one or more devIDs (local node devIDs and cluster devID) to establish a lock loss call back (LLCB) when the controller 504 gives up the locks. By flashing the locks, the controller 504 can cache the various LVB generation numbers (being copies of the SBT generation numbers). The generation numbers can be returned to the service manager entity, or other entities requesting subscription, by the controller 504 (e.g., using the event subsystem 290). While awaiting any changes in SBT generation numbers, the controller 504 can be in a steady state.

After passage of time, the controller can reestablish various locks in the SBT, obtain the latest generation numbers and compare the latest generation numbers to the cached generation numbers. Where a generation number has changed, the controller 504 can cache the new generation number and communicate the new generation number to the service manager entity (and/or to any other subscriber entity). For example, the generation number change can be an indication that a new work assignment is available for the service manager entity to pick up for itself or for another node/service to execute the work assignment.

It is noted that the obtaining of updated generation numbers by the controller 504 can comprise writing of data related to updated and/or new work assignments in view of requests from one or more client entities. In connection with such writing, the controller 504 can update and cache respective generation numbers for subsequent communication of the generation numbers to the service manager entity and/or any other subscriber entity.

Figure 7:
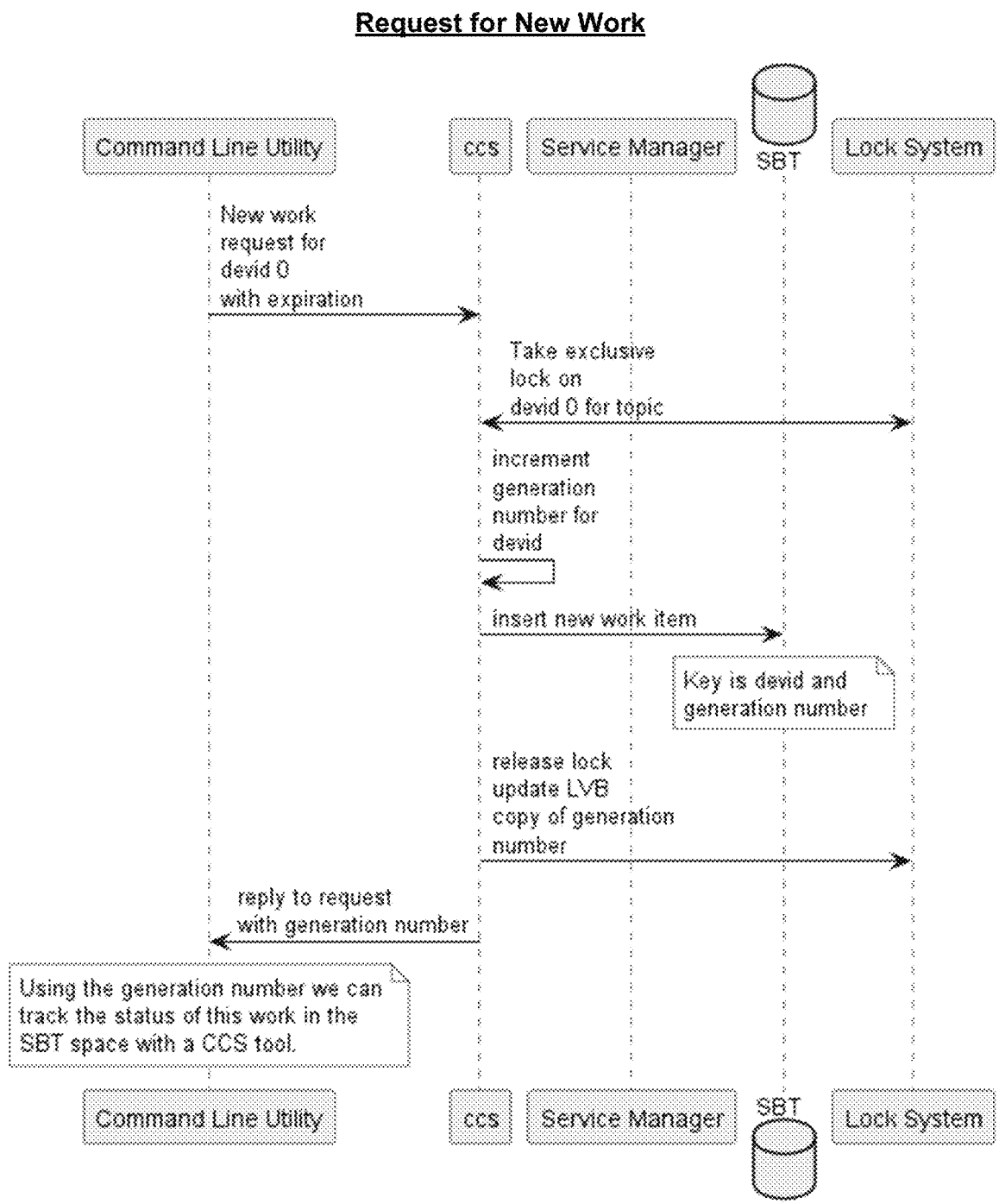
FIG. 7 illustrates a process flow diagram of one or more processes performed by the work coordination system of FIG. 5, in accordance with one or more embodiments and/or implementations described herein.

Turning to FIG. 7, provided is a process sequence illustration 700 including a request for new work. Elements illustrated include the controller 504 (CCS), a service manager (client entity), a command line utility (another client entity), the SBT system 115 and the lock system 114.

New work can be registered to a topic using the "new" verb and arguments include the topic itself, the devID, and the payload that encodes the work. The controller 504 (CCS) updates the generation number for the devID included in the request.

That is, a client entity, here the command line utility entity, can send a request for posting of data related to a new work assignment to the controller 504. The data to write can include a devID to which the work assignment applies and an expiration by which the work assignment should be completed or collected by the evaluator 508. In one or more embodiments, the data can comprise information regarding the work assignment itself and/or instruction to extend the expiration data for one or more reasons.

In response, the controller 504 can take a lock at the lock system 114 relative to a particular SBT/topic of the SBT system 115. The controller 504 can increment a generation number related to the respective devID and can write the data related to the new work assignment to a respective envelope at and/or corresponding to the particular SBT/topic. As described above, at least a portion of the information can be written in the form of a key/value pair, where higher order bytes of the key/value pair comprise the devID of the node being addressed by the work assignment and where lower order bytes of the key/value pair comprise the SBT generation number.

The controller 504 can subsequently release the lock, update the associated lock value block copy of the generation number (e.g., LVB generation number), and can communicate a notification of completion to the requesting entity (e.g., here, the command line utility). This communication can comprise the updated or new SBT generation number.

It is noted that in response to receipt of the generation number, the command line utility can request subscription to the SBT based on the generation number, to allow for tracking of status of the work assignment. This request can be sent to the controller 504, as illustrated at FIG. 6 and as described above relative to FIG. 6.

Also, as noted above, release of the exclusive lock by the controller 504 can serve as a notification system to one or more other subscribing entities (e.g., subscribed to dev/ID 0) that a change has occurred at the SBT system relative to an entry for which a subscription was obtained/requested. In response, these subscribing entities can query the SBT system 115 to determine what SBT generation numbers have changed and compare the returned SBT generation numbers against those cached by the subscribing entities. Where an SBT generation number has changed, a subscribing entity can flash a lock for a related SBT to obtain access to the corresponding envelope and any updated and/or new information data at the corresponding envelope.

Figure 8:
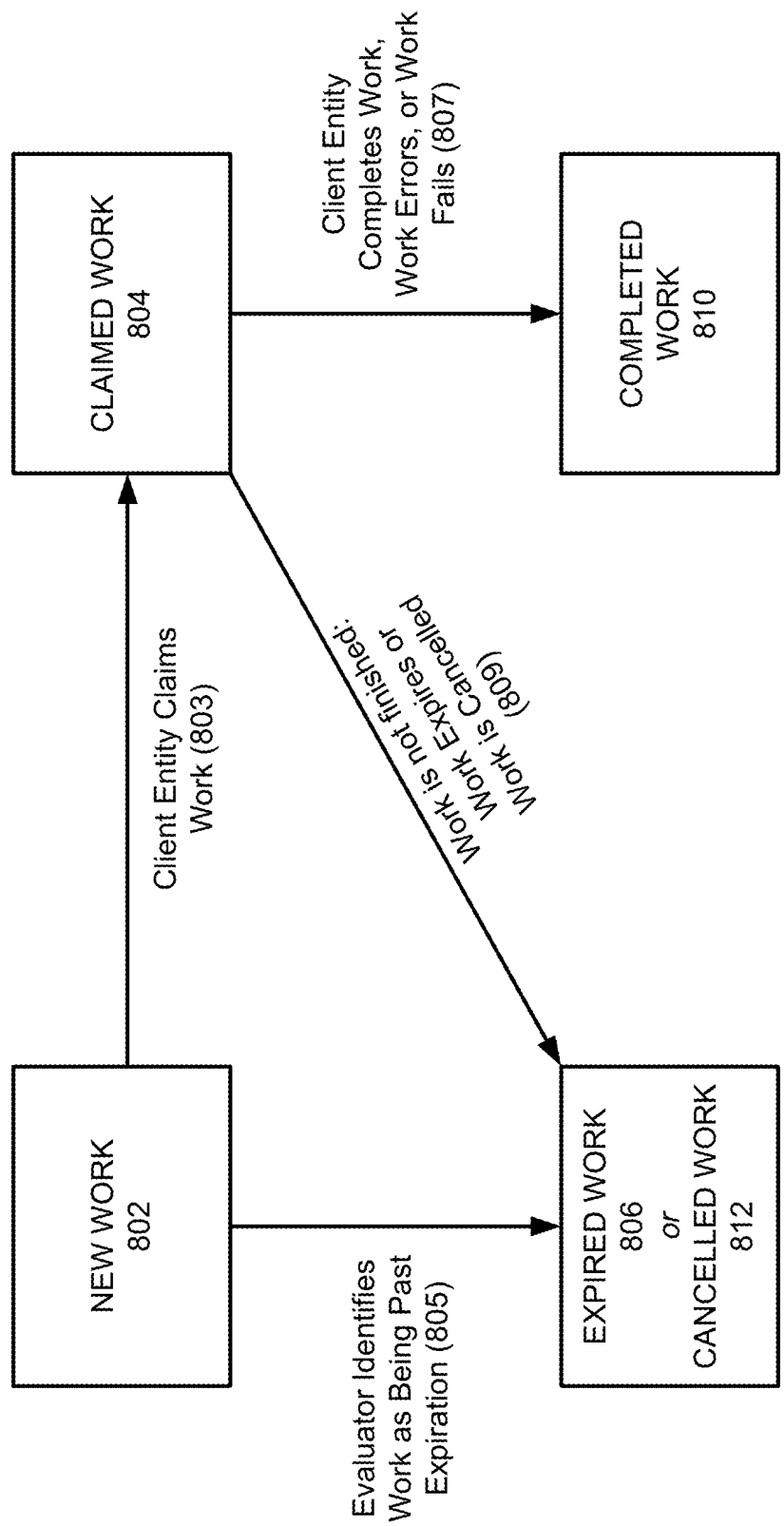
FIG. 8 illustrates a process flow diagram of one or more processes performed by the work coordination system of FIG. 5, in accordance with one or more embodiments and/or implementations described herein.

Turning to FIG. 8, provided is a schematic block diagram 800 demonstrating the various statuses of work assignments used by the work coordination system 502.

As illustrated, and as indicated above, a new work assignment 802 can be updated to a status of claimed or expired, with claimed work assignments being possibly updated to expired or some version of a completed status. For example, a new work assignment 802 can be claimed (e.g., at 803) by a service manager entity, work consumer entity, or the like. Upon sending a request to the controller 504, the SBT can be updated such that the work assignment can be updated to a status of claimed work 804. This work claiming process is described next relative to FIG. 9.

Figure 9:
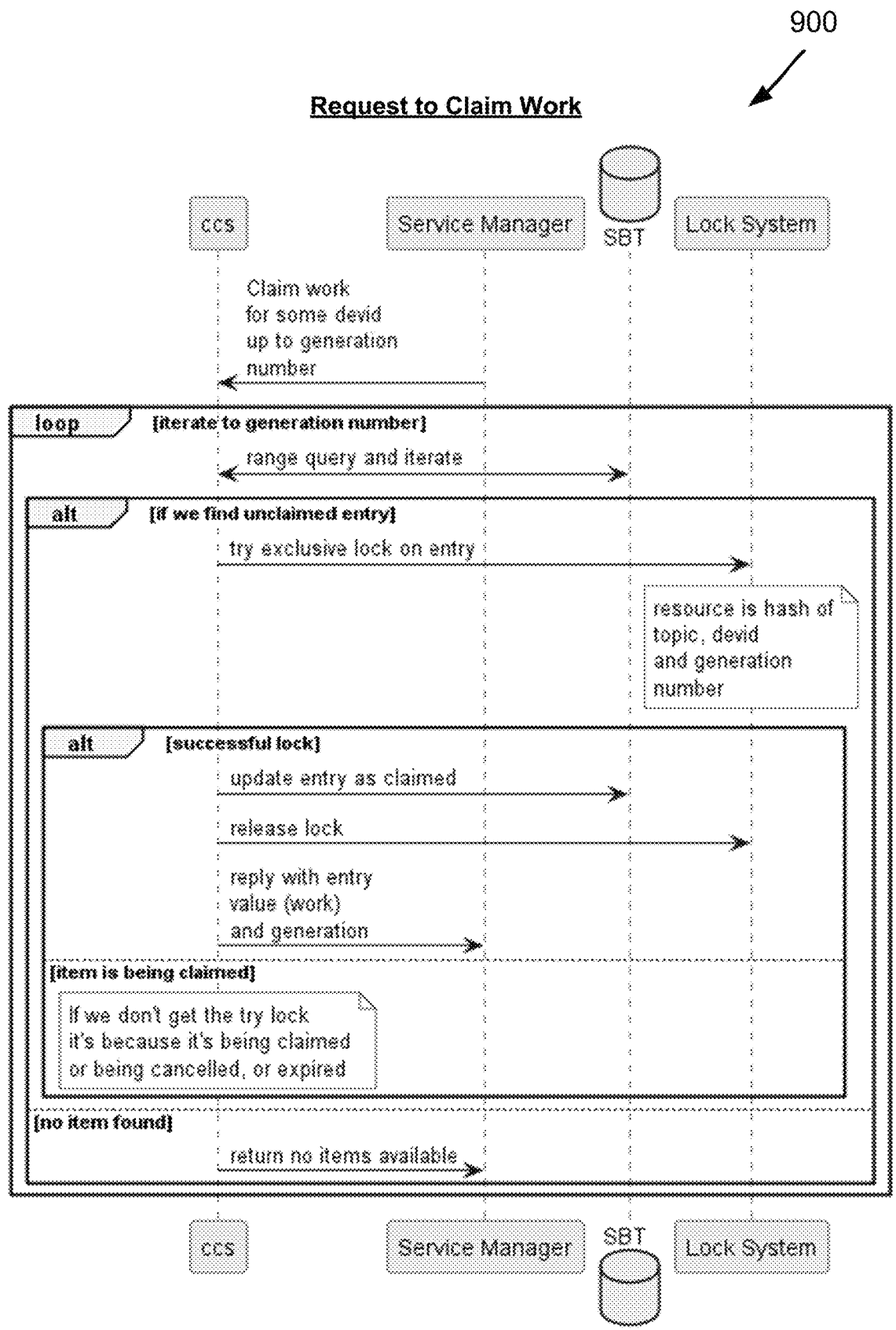
FIG. 9 illustrates a process flow diagram of one or more processes performed by the work coordination system of FIG. 5, in accordance with one or more embodiments and/or implementations described herein.

Turning to FIG. 9, provided is a process sequence illustration 900 including claiming of work by the service manager entity. Elements illustrated include the controller 504 (CCS), a service manager (client entity), SBT system 115 and the lock system 114.

Work can be claimed from the controller 504 (CCS) by using the "claim" verb and supplying the devID we're interested in. The controller 504 can execute a range query over the SBT entries for this topic, iterating over each value examining the envelope looking for unclaimed work. When it finds a candidate, it should try to take an exclusive lock for a resource that is a hash of the topic, the devID, and the generation number associated with the work. If it fails, it's because something else is currently picking the work up. If the lock is granted, the controller 504 can update the claimed status in the envelope, release the lock, and return the payload after the envelope to the caller.

That is, a service manager entity, work consumer entity or the like can send a request to the controller 504 to request a set of generation numbers for a devID by marked as claimed. The controller 504 can perform a range query at the SBT system 115 and iterate. This can be possible and efficient due to the use of the writing of data to SBT envelopes using key/value pairs, as described above. Where the controller 504 determines, based on the SBT generation numbers not yet having been updated beyond that cached by the controller 504, that the requested work assignments are unclaimed, the controller 504 can attempt to take exclusive locks in the one or more SBT entries. The controller 504 can update the respective statuses of the work assignments for which exclusive locks were obtained, update the respective generation numbers, release the locks, and subsequently reply to the service manager entity (or other claiming entity). The reply can be that the work assignments have been successfully claimed and can comprise the updated generation numbers. Alternatively, the reply can comprise that one or more work assignments have not been successfully claimed and can comprise a return indicating no items available. In one or more embodiments, the service manager entity can assign the claimed work assignments to one or more work consuming nodes for execution of the work assignments.

As noted above, release of the locks by the controller 504 can serve as a notification system to one or more other subscribing entities that a change has occurred at the SBT system relative to an entry for which a subscription was obtained/requested. In response, these subscribing entities can query the SBT system 115 to determine what SBT generation numbers have changed and compare the returned SBT generation numbers against those cached by the subscribing entities. Where an SBT generation number has changed, a subscribing entity can flash a lock for a related SBT to obtain access to the corresponding envelope and any updated and/or new information data at the corresponding envelope.

Turning again briefly to FIG. 8, a claimed work assignment 804 can have one or more events 807 occur relative to the claimed work assignment 804. For example, a work consumer entity can complete the work assignment and/or the work assignment can error or otherwise fail. That is, completed work can have a completed status and also can have a sub-status of successful, failed (e.g., errored) or cancelled.

Figure 10:
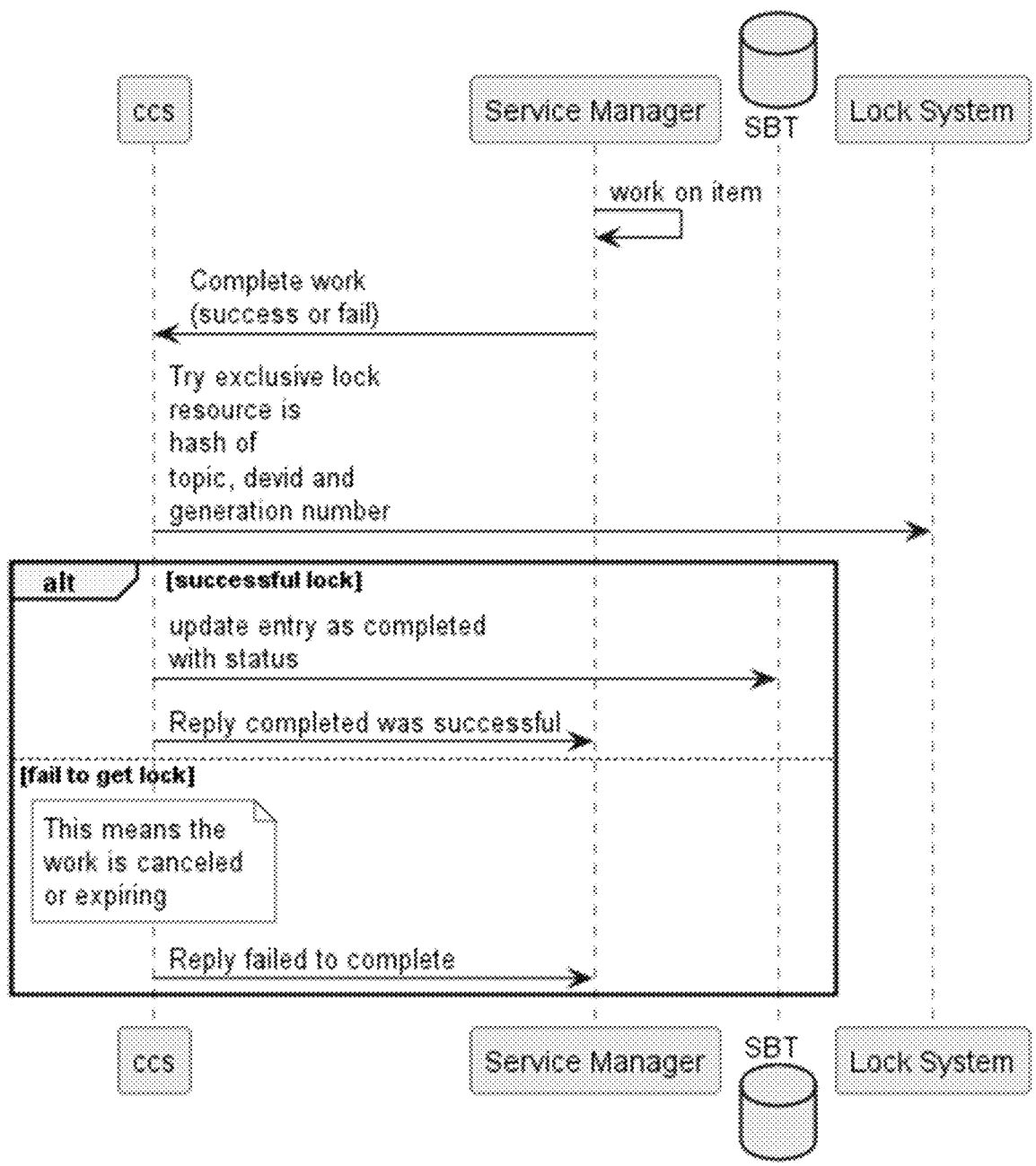
FIG. 10 illustrates a process flow diagram of one or more processes performed by the work coordination system of FIG. 5, in accordance with one or more embodiments and/or implementations described herein.

Turning first to FIG. 10 and to completion of a respective work assignment, provided is a process sequence illustration 1000 of a state of completion of a work assignment. Elements illustrated include the controller 504 (CCS), a service manager (client entity), SBT system 115 and the lock system 114.

Claimed can be completed by a service entity as either success or failure and carry a string suitable for a log entry. In either case the controller can be informed of the status through the "complete" verb, and the SBT can be updated accordingly.

That is, a service manager entity can report a communication to the controller 504 that a work assignment is completed (e.g., success or failed). In response, the controller 504 can attempt to obtain an exclusive lock using the lock system 114 for the SBT of the SBT system 115 corresponding to the respective work assignment. Where the lock is successfully obtained, the controller 504 can update the respective envelope/entry with the completed status. The updating can comprise updating with a sub-status such as success or failed. The lock can be released by the controller 504, and the controller 504 can report that the updating of the status to completed was successful to the service manager entity. Alternatively, where the lock is not successfully obtained, and the controller 504 fails to obtain the lock, this can mean that the corresponding SBT generation number has already been changed, and thus that the work assignment can have been cancelled and/or is expired, for example. Alternatively, this can mean that a worker entity is updating the record, or that a client entity is canceling the work, and thus that the exclusive lock was obtained before the controller 504 could obtain the exclusive lock. This failure to update the status by the controller 504 can be communicated to the requesting entity by the controller 504.

Again, as noted above, release of a lock by the controller 504 can serve as a notification system to one or more other subscribing entities that a change has occurred at the SBT system relative to an entry for which a subscription was obtained/requested. In response, these subscribing entities can query the SBT system 115 to determine what SBT generation numbers have changed and compare the returned SBT generation numbers against those cached by the subscribing entities. Where an SBT generation number has changed, a subscribing entity can flash a lock for a related SBT to obtain access to the corresponding envelope and any updated and/or new information data at the corresponding envelope.

Turning again briefly to FIG. 8, a claimed work assignment 804 can have one or more events 809 occur relative to the claimed work assignment 804. For example, a work assignment can expire (e.g., based on the expiration data written to the envelope) or the work can be cancelled after a successful request of cancellation from a client entity. That is, completed work can have a completed status and also can have a sub-status of successful, failed (e.g., errored) or cancelled.

Figure 11:
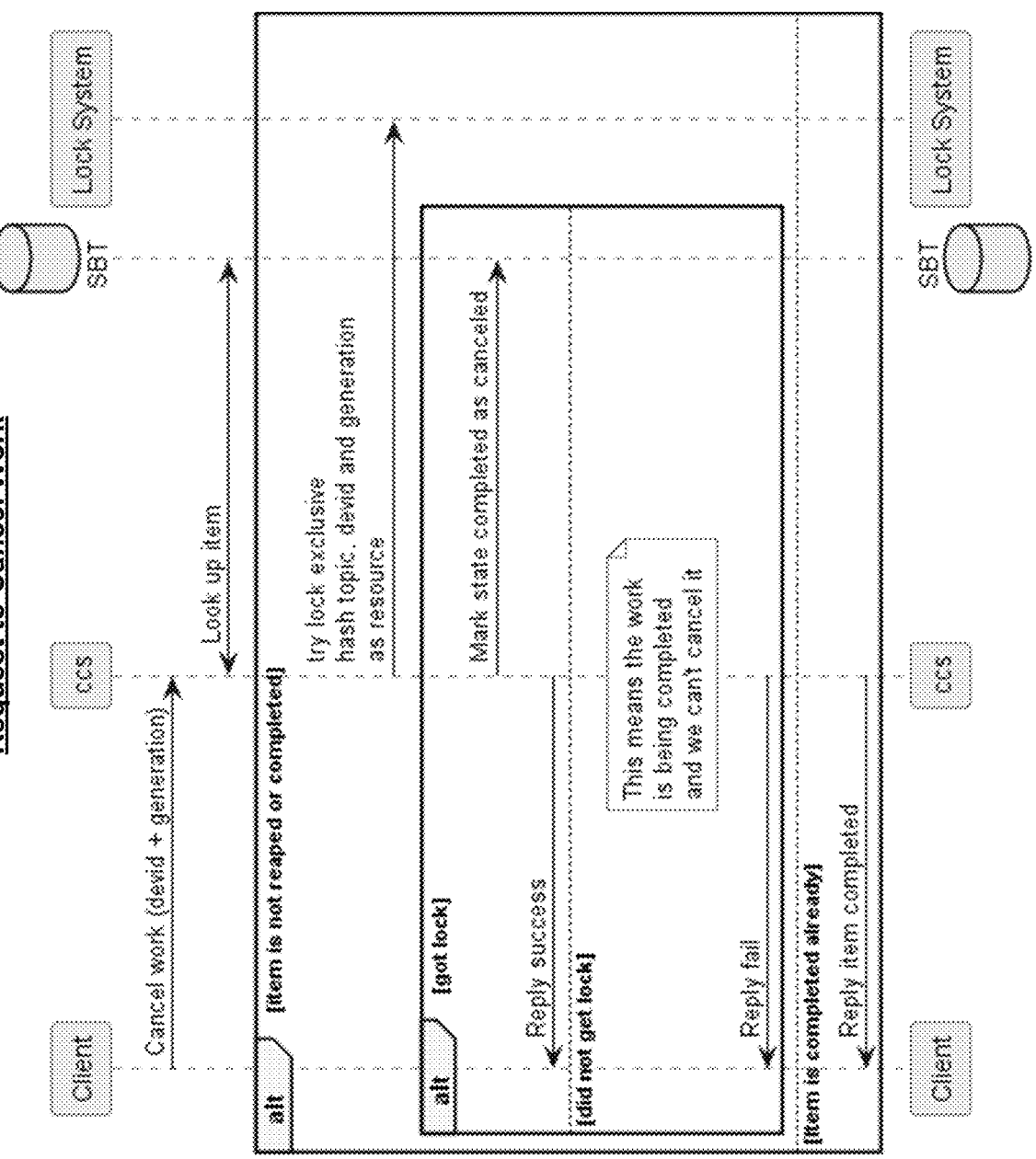
FIG. 11 illustrates a process flow diagram of one or more processes performed by the work coordination system of FIG. 5, in accordance with one or more embodiments and/or implementations described herein.

Turning first to cancellation of a work assignment, and to FIG. 11, provided is a process sequence illustration 1100 including a request to cancel work. Elements illustrated include the controller 504 (CCS), a client entity, the SBT system 115 and the lock system 114.

Canceling a work assignment can employ a cancel-requesting entity knowing the generation number of the work assignment being requested to be canceled, and the devID for the topic. A cancellation status can be considered a sub-status of completed work or as a separate status, but is generally a special case of completing claimed work, so an exclusive lock is employed to update the SBT/topic.

That is, a client entity can initiate a communication to the controller 504 (CCS) to cancel a work assignment. The request can include the associated devID and generation number. This client entity can be the same client entity having previously requested data entry regarding the work assignment as new, the client entity having claimed the work assignment, or another client entity entirely. This client entity need not be subscribed to the SBT but instead must have access to the corresponding devID and generation number.

As with previous processes discussed above, the controller 504 can query the SBT system 115 with the devID and generation number. The controller 504 can attempt to obtain an exclusive lock using the lock system 114. Where a lock is successfully obtained, the controller 504 can update the status of the work assignment as cancelled, can update the respective SBT generation number, and can send a notification of successful update of the status to the cancellation-requesting entity. Alternatively, where attempt to obtain the lock fails, this can mean that the corresponding SBT generation number has already been changed, and thus that the work assignment is claimed and in a state of being completed, for example. This failure to update the status by the controller 504 can be communicated to the requesting entity by the controller 504. Alternatively, where query by the controller 504 to the SBT returns a different generation number related to the devID, the controller 504 can flash a lock for the SBT to determine the change in status that has already been made (e.g., data written) to the work assignment. For example, the work assignment can have already been completed, and the controller 504 can report this back to the requesting client entity.

Again, as noted above, release of a lock (exclusive or shared) by the controller 504 can serve as a notification system to one or more other subscribing entities that a change has occurred at the SBT system relative to an entry for which a subscription was obtained/requested. In response, these subscribing entities can query the SBT system 115 to determine what SBT generation numbers have changed and compare the returned SBT generation numbers against those cached by the subscribing entities. Where an SBT generation number has changed, a subscribing entity can flash a lock for a related SBT to obtain access to the corresponding envelope and any updated and/or new information data at the corresponding envelope.

Before turning next to expiration of work, additional description is provided relative to reasoning why a lock would be unable to be obtained by the controller 504.

For example, lock can not be obtained if the lock type requested is not compatible with other held locks. Competition for incompatible locks can be by design and can enable proper function between the lock system 114, SBT system 115 and work coordination system 502.

In order to update an entry in an SBT, the controller 504 take an exclusive lock for that entry in the associated lock domain. Since no two threads in the cluster can have an exclusive lock at the same time, a locker attempting to do so will fail if one already exists. That means that whatever assumptions are cached regarding values in that SBT entry are probably old and about to be invalidated by the other exclusive locker. In this way the overall system 200 can prevent parallel updates from happening to the SBT entries (and possibly incorrect ones).

As an example, an evaluator 508 might operate to attempt to mark an item (e.g., work assignment) as expired, but a worker entity might also be trying to complete the item (e.g., work assignment) in the last moments. As such, it can be a race to be the first one in (e.g., to take a lock), and it can be non-important to the overall system 200 that the evaluator 508 be 100% perfect in marking items expired. If the worker entity completes work and requests entry of a completion status (e.g., by the controller 504), or makes such entry itself or by use of another client entity accessing the SBT system 115, before the evaluator 508 reaps (e.g., updates the status per the evaluator operation and/or deletes expired work assignments) then the work coordination system 502 can accept the completion status instead.

Figure 12:
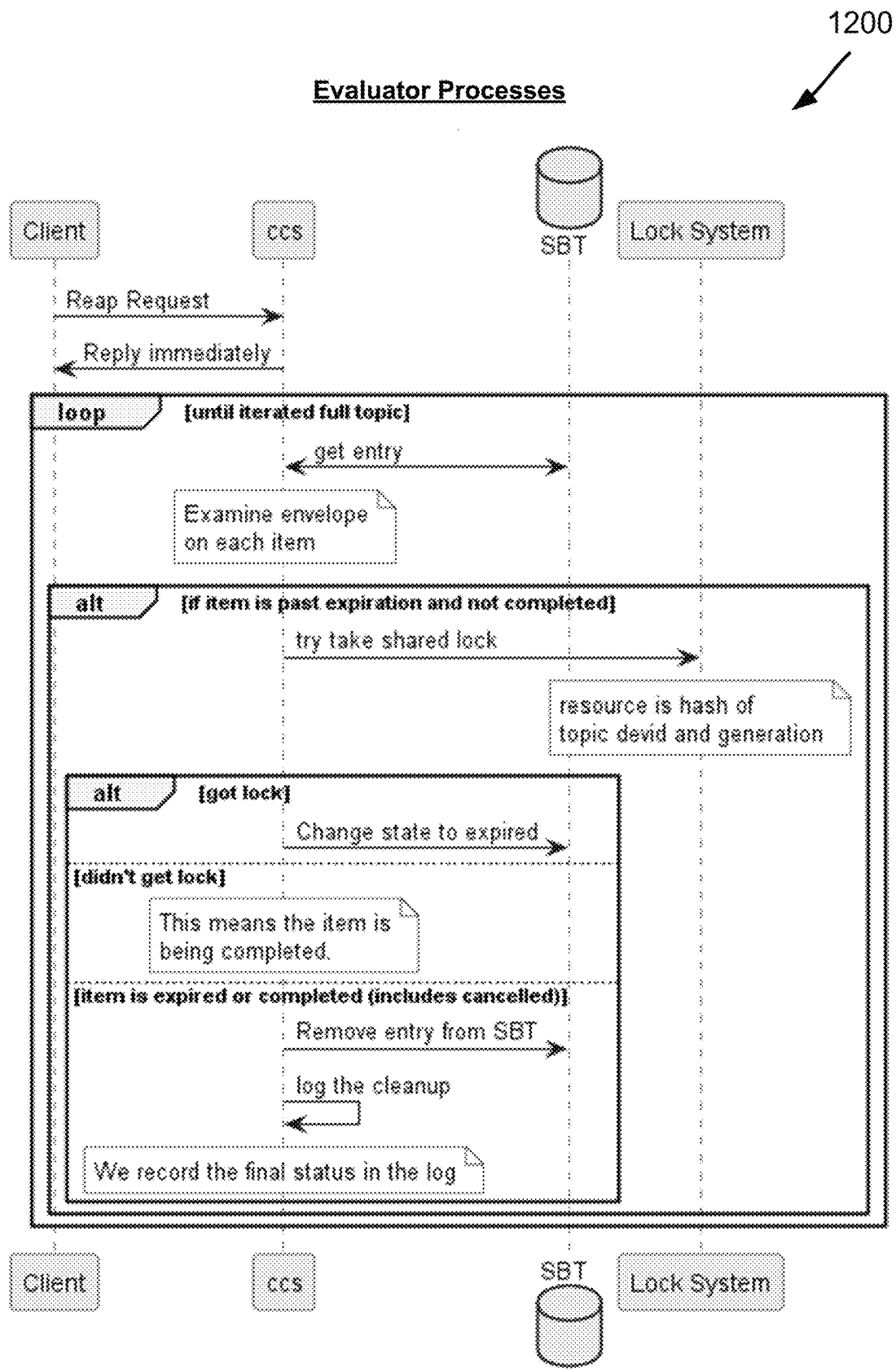
FIG. 12 illustrates a process flow diagram of one or more processes performed by the work coordination system of FIG. 5, in accordance with one or more embodiments and/or implementations described herein.

Turning next to expiration of work (e.g., an expired work assignment 806), and also to collection (e.g., clean up) of cancelled work assignments 812 and completed work assignments 810, attention is directed to FIG. 12. At FIG. 12, provided is a process sequence illustration 1200 of one or more processes that can be performed by the evaluator 508 (reaper) as comprised by the controller 504 (CCS). Elements illustrated include the controller 504 (CCS), a client entity, the SBT system 115 and the lock system 114.

The reap verb can be sent to the controller 504 (CCS) periodically, upon demand, and/or at any determined interval, thus causing the controller 504 and/or the evaluator 508 to walk the SBT for the provided topic. This reap request can be sent by any client entity having access to the controller 504. For each item (e.g., leaf/work assignment of the SBT), the evaluator 508 can examine the deadline on the envelope and can determine if non-terminal state work has expired. If the work assignment has expired, the evaluator 508 can attempt to take an exclusive lock on the hashed resource of topic, devID and generation number. If the evaluator 508 succeeds, the evaluator 508 can update the entry envelope to the expired state and subsequently update the respective generation number. If the evaluator 508 fails to obtain the lock, this can mean that a worker entity is updating the record, or that a client entity is canceling the work, and thus that the exclusive lock was obtained before the evaluator 508 could obtain the exclusive lock. Other entries that are already in terminal states can be deleted from the SBT by the evaluator 508, with the respective envelope data for success, failure, cancelled or expired written to the log 520.

That is, as noted above, based on the walking of the SBT, the evaluator 508 can generate and/or update the log 520 (or any one or more additional logs) associated with the SBT with any information (e.g., time data, telemetry data, time to completion data, resource use data, failure reasoning data, error reasoning data, and/or the like) obtained from the walking of the SBT.

In response to the walking of the SBT, a response can be sent back to the reap-requesting entity that the reaping (e.g., collecting) has been performed. A response likewise can include any update in generation numbers, such as where a work assignment envelope was marked to extend an expiration number if expired, and thus the evaluator 508/controller 504 can have updated the respective SBT generation number.

Finally, again, as noted above, release of a lock by the controller 504 can serve as a notification system to one or more other subscribing entities that a change has occurred at the SBT system relative to an entry for which a subscription was obtained/requested. In response, these subscribing entities can query the SBT system 115 to determine what SBT generation numbers have changed and compare the returned SBT generation numbers against those cached by the subscribing entities. Where an SBT generation number has changed, a subscribing entity can flash a lock for a related SBT to obtain access to the corresponding envelope and any updated and/or new information data at the corresponding envelope.

Synopsis of Example Operations

Figure 14:
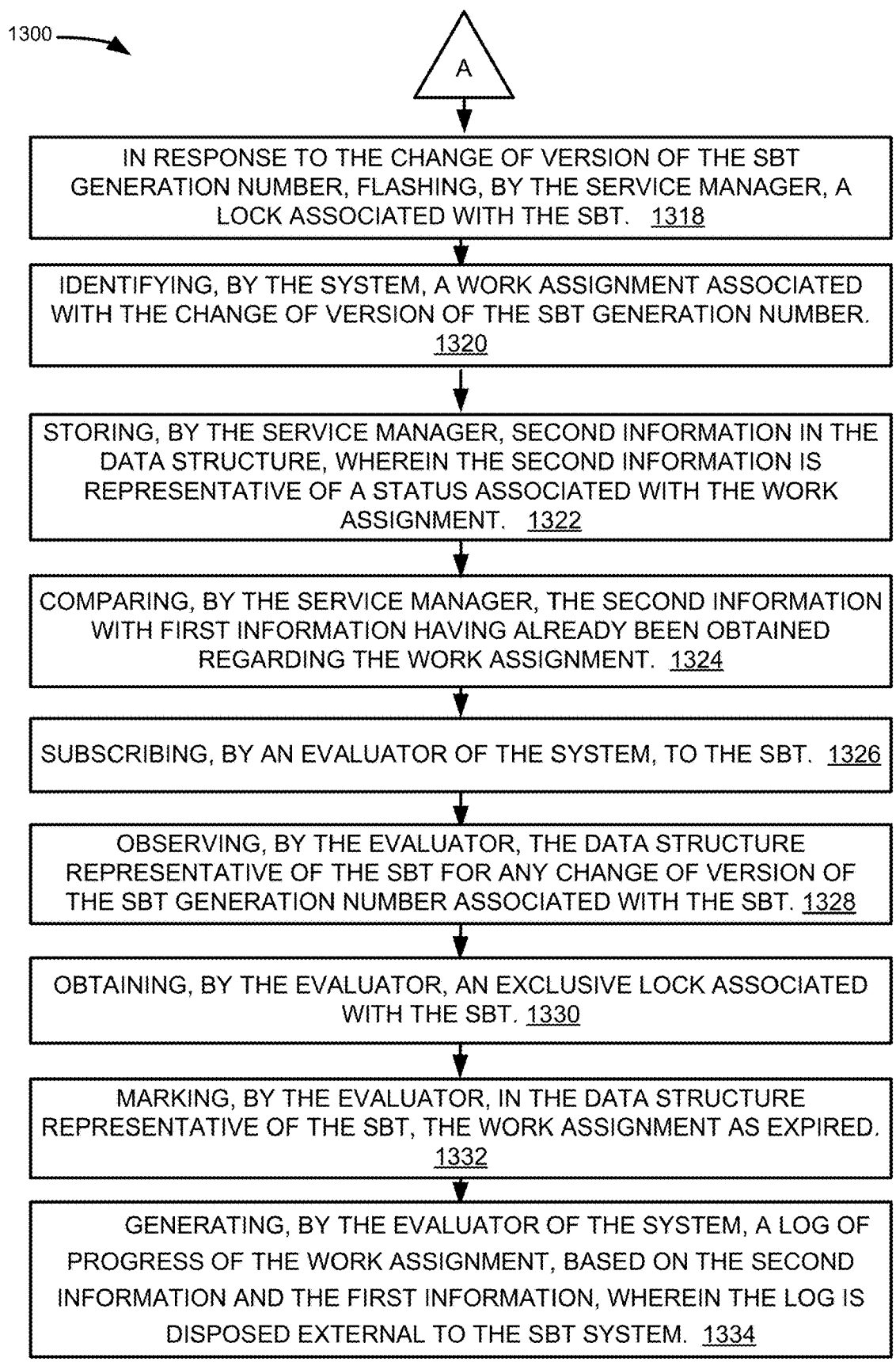
FIG. 14 illustrates a continuation of the process flow diagram of FIG. 13 of a method of use of the work coordination system of FIG. 5, in accordance with one or more embodiments and/or implementations described herein.

Turning now to FIGS. 13 and 14, a process flow comprising a set of operations for broadcasting a notification, relative to a work assignment, for an SBT system by using a lock system is illustrated relative to FIGS. 1-12. One or more elements, objects and/or components referenced in the process flow 1300 can be those of schematics 100-1200. Repetitive description of like elements and/or processes employed in respective embodiments is omitted for sake of brevity.

At operation 1302, the process flow 1300 can comprise implementing, by a system comprising a processor (e.g., controller 504 using lock system 114) an exclusive lock in a lock domain that identifies a data structure representative of a system B-tree (SBT) of an SBT system (e.g., SBT system 115).

At operation 1304, the process flow 1300 can comprise updating, by the system (e.g., controller 504), an SBT generation number associated with the SBT, resulting in a first version of the SBT generation number.

At operation 1306, the process flow 1300 can comprise updating, by the system (e.g., controller 504), the first version of the SBT generation number to the second version of the SBT generation number in response to insertion of the work assignment into the data structure representative of the SBT.

At operation 1308, the process flow 1300 can comprise generating, by the system (e.g., lock system 114), a notification that the work assignment has been selected for execution by a claiming entity.

At operation 1310, the process flow 1300 can comprise releasing, by the system (e.g., controller 504 using lock system 114), an exclusive lock in the lock domain causing the execution of the lock loss call back at the SBT.

At operation 1312, the process flow 1300 can comprise enabling subscription, by the system (e.g., controller 504), by a client entity to the SBT.

At operation 1314, the process flow 1300 can comprise enabling observation, by the system (e.g., controller 504), by the client entity of the data structure representative of the SBT for any change of version of the SBT generation number associated with the SBT.

At operation 1316, the process flow 1300 can comprise executing, by the system (e.g., controller 504), in response to execution of a lock loss call back at the SBT, a comparison of the first version of the SBT generation number with a second version of the SBT generation number to determine a change of version of the SBT generation number.

At operation 1318, the process flow 1300 can comprise, in response to the change of version of the SBT generation number, flashing, by the service manager (e.g., client entity 510), a lock associated with the SBT.

At operation 1320, the process flow 1300 can comprise identifying, by the system (e.g., controller 504), a work assignment associated with the change of version of the SBT generation number. This can comprise querying of the SBT and/or flashing of a lock related to the SBT.

At operation 1322, the process flow 1300 can comprise storing, by the service manager (e.g., client entity 510), second information in the data structure, wherein the second information is representative of a status associated with the work assignment.

At operation 1324, the process flow 1300 can comprise comparing, by the service manager (e.g., client entity 510), the second information with first information having already been obtained regarding the work assignment.

At operation 1326, the process flow 1300 can comprise subscribing, by an evaluator of the system (e.g., evaluator 508), to the SBT.

At operation 1328, the process flow 1300 can comprise observing, by the evaluator (e.g., evaluator 508), the data structure representative of the SBT for any change of version of the SBT generation number associated with the SBT.

At operation 1330, the process flow 1300 can comprise obtaining, by the evaluator (e.g., evaluator 508), an exclusive lock associated with the SBT.

At operation 1332, the process flow 1300 can comprise marking, by the evaluator (e.g., evaluator 508), in the data structure representative of the SBT, the work assignment as expired.

At operation 1334, the process flow 1300 can comprise generating, by the evaluator of the system (e.g., evaluator 508), a log of progress of the work assignment, based on the second information and the first information, wherein the log is disposed external to the SBT system.

Turning next to FIGS. 15 and 16, a process flow comprising another set of operations for broadcasting a notification, relative to a work assignment, for an SBT system by using a lock system is illustrated relative to FIGS. 1-12. One or more elements, objects and/or components referenced in the process flow 1500 can be those of schematics 100-1200. Repetitive description of like elements and/or processes employed in respective embodiments is omitted for sake of brevity.

At operation 1502, the process flow 1500 can comprise obtaining (e.g., by the controller 504) information associated with a work assignment that is available for execution.

At operation 1504, the process flow 1500 can comprise writing data (e.g., by the controller 504) to an envelope (e.g., envelope 532) of a leaf, of a system B-tree (SBT) (e.g., SBT 530) of an SBT system (e.g., SBT system 115), comprising the information associated with the work assignment, wherein the envelope is comprised by a cache associated with the leaf, and wherein the writing data to the envelope comprises updating an SBT generation number associated with the leaf.

At operation 1506, the process flow 1500 can comprise writing (e.g., by the controller 504) the data to the envelope comprising writing the data as a key/value pair (e.g., key/value pair 534).

At operation 1508, the process flow 1500 can comprise writing (e.g., by the controller) the data as the key/value pair, wherein higher order bytes of the key/value pair comprise a device identifier (ID) of a node being addressed by the work assignment, and wherein lower order bytes of the key/value pair comprise the SBT generation number.

At operation 1510, the process flow 1500 can comprise generating (e.g., by the controller 504 using the lock system 114), a notification that the work assignment is available.

At operation 1512, the process flow 1500 can comprise monitoring (e.g., by the controller 504 and/or a client entity 510) the SBT system for changes to SBT generation numbers associated with the SBTs.

At operation 1514, the process flow 1500 can comprise identifying (e.g., by the controller 504 and/or a client entity 510) a change in the SBT generation number of the SBT generation numbers.

At operation 1516, the process flow 1500 can comprise flashing a lock (e.g., by the controller 504 employing the lock system 114) associated with the leaf.

At operation 1518, the process flow 1500 can comprise, in response to flashing the lock, obtaining (e.g., by the controller) read access to the leaf.

At operation 1520, the process flow 1500 can comprise making a configuration change (e.g., by the controller 504) comprising indicating, at the envelope, that the work assignment has been claimed.

At operation 1522, the process flow 1500 can comprise monitoring (e.g., by the evaluator 508) states of work assignments associated with the SBT system, comprising the work assignment.

At operation 1524, the process flow 1500 can comprise, based on the monitoring, generating (e.g., by the evaluator) a log of work assignments, wherein the log is accessible external to the SBT system.

At operation 1526, the process flow 1500 can comprise flashing (e.g., by the evaluator 508 employing the lock system 114) a lock associated with one of the SBTs that is associated with a failed work assignment, other than the work assignment.

At operation 1528, the process flow 1500 can comprise marking (e.g., by the evaluator) the failed work assignment as expired at a respective envelope of the one of the SBTs that is associated with the failed work assignment.

Turning next to FIG. 17, a process flow comprising yet another set of operations for broadcasting a notification, relative to a work assignment, for an SBT system by using a lock system is illustrated relative to FIGS. 1-12. One or more elements, objects and/or components referenced in the process flow 1700 can be those of schematics 100-1200. Repetitive description of like elements and/or processes employed in respective embodiments is omitted for sake of brevity.

At operation 1702, the process flow 1700 can comprise, based on a subscription to a system B-tree (SBT) of an SBT system (e.g., SBT system 115), monitoring (e.g., by a client entity and/or the controller 504) the SBT for a change to a generation number associated with the SBT (e.g., SBT 530).

At operation 1704, the process flow 1700 can comprise, in response to determining that the change to the generation number associated with the SBT has occurred, flashing a lock (e.g., by the controller 504 employing the lock system 114) associated with the SBT and subsequently reading information of a key/value pair (e.g., key/value pair 532) associated with the work assignment.

At operation 1706, the process flow 1700 can comprise reading the information of the key/value pair, wherein first bytes of a first order of the key/value pair comprise a device ID of a node (e.g., node 110) being addressed by the work assignment and second bytes of a second order of the key/value pair comprise a generation number of the SBT.

At operation 1708, the process flow 1700 can comprise caching information (e.g., by the controller 504) from the SBT associated with the work assignment in response to the determining that the change to the generation number associated with the SBT has occurred.

At operation 1710, the process flow 1700 can comprise assigning (e.g., by a client entity 510, such as a service manager entity) a work assignment to a work node based on determining that the change to the generation number associated with the SBT has occurred.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the FIGS. provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein is related to work coordination through use of a system B-Tree system. An example method can comprise implementing, by a system comprising a processor, an exclusive lock in a lock domain that identifies a data structure representative of a system B-tree (SBT) of an SBT system, updating, by the system, an SBT generation number associated with the SBT, resulting in a first version of the SBT generation number, executing, by the system, in response to execution of a lock loss call back at the SBT, a comparison of the first version of the SBT generation number with a second version of the SBT generation number to determine a change of version of the SBT generation number, and identifying, by the system, a work assignment associated with the change of version of the SBT generation number.

An example advantage of one or more of the above-indicated method, system and/or non-transitory computer-readable medium can be an efficient ability to track newly-available work assignments, claim available work assignments, and/or track progress of claimed work assignments. These operations can be facilitated by one or more aspects (e.g., a controller) of a single work assignment coordination system rather than through use of one or varied and more complex subsystems.

Another example advantage of one or more of the above-indicated method, system and/or non-transitory computer-readable medium can be an ability for entities external to the respective framework to request and to monitor subscriptions for various SBT system aspects (e.g., SBTs or leaves) of a related SBT system. This can allow for such entities to track progress of work assignments (e.g., including claiming work assignments) by use of the subscription implemented at the SBT and/or by taking a lock for an SBT. Notification can be provided by release of an exclusive lock by another entity and/or by monitoring, via the subscriptions, changes in SBT numbers of an SBT.

That is, continuous polling of the SBT system, and/or of SBT space associated therewith, is not performed by client entities of the work coordination system. Rather, subscribers can rely on a steady state of the SBT space until receipt of a notification of a possible change to the SBT space. As noted above, such notification can be due to an updated SBT generation number and associated subscription or due to a change relative to a lock of the lock domain associated with the SBT system. That change relative to a lock can comprise implementation of an exclusive lock, release of an exclusive lock, automatic release of a shared lock and/or implementation of a shared lock.

Yet another example advantage of one or more of the above-indicated method, system and/or non-transitory computer-readable medium can be the use of envelopes cached at the SBTs for storing and providing information on work assignments within the SBT system. That is, an envelope can be generated and data written to the envelope for one or more aspects (e.g., work assignments and/or leaves) of an SBT. Each envelope can comprise information about a corresponding work assignment which can be easily accessible by flashing a lock for the SBT related to the corresponding SBT aspect. Further, each envelope, of various envelopes at the corresponding SBT system, can have a common ordering and common information types, allowing for consistency and ease of access by a controller of the work coordination system.

Still another example advantage of one or more of the above-indicated method, system and/or non-transitory computer-readable medium can be use of a evaluator to update changes in work assignment statuses to the various envelopes of an SBT system. This evaluator can be an API of the controller. Use of the evaluator can provide a single agent of the framework to remove and/or otherwise clean up expired, completed and/or cancelled work assignment information at the envelopes.

Another example advantage of one or more of the above-indicated method, system and/or non-transitory computer-readable medium can be generation of one or more logs comprising the statuses and/or other information regarding the work assignments. A log can be stored external to the SBT system for access by various entities without knowing SBT generation numbers and without taking a lock for an SBT of the SBT system. In connection with the one or more envelope-based clean up actions that can be performed by the evaluator, the evaluator can generate and/or write to the log. By storing of the log external to the SBT system, the log can be more easily accessed, such as for troubleshooting purposes of one or more work assignments.

In one or more embodiments of the above-indicated method, system and/or non-transitory computer-readable medium, data corresponding to one or more work assignments can be written at the SBT system as a key/value pair. Higher order bytes of the key/value pair can comprise a device identifier (ID) of a node being addressed by the work assignment, and lower order bytes of the key/value pair can comprise the current SBT generation number associated with the work assignment. Use of the key/value pairs can allow for easy sorting and querying of the work assignments and related nodes being address by the work assignments.

Indeed, the one or more embodiments described herein can provide automatic indication of update of a work assignment (such as status thereof) by update to an SBT generation number change associated with the work assignment. Notification likewise can be implemented due to release of an exclusive lock for the SBT corresponding to the work assignment. And thus, as indicated above, polling at a frequency by client entities (e.g., nodes) is not employed, or can be employed at a low frequency. Instead notification can be by way of subscription service, using the controller of the work coordination system.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the fields of node-to-node communication, work distribution and/or the like, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively implement and/or release locks of a lock domain, write changes to a system B-tree, and/or control an evaluator API as the one or more embodiments described herein can facilitate these processes. And, neither can the human mind nor a human with pen and paper automatically perform one or more of the processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 18:
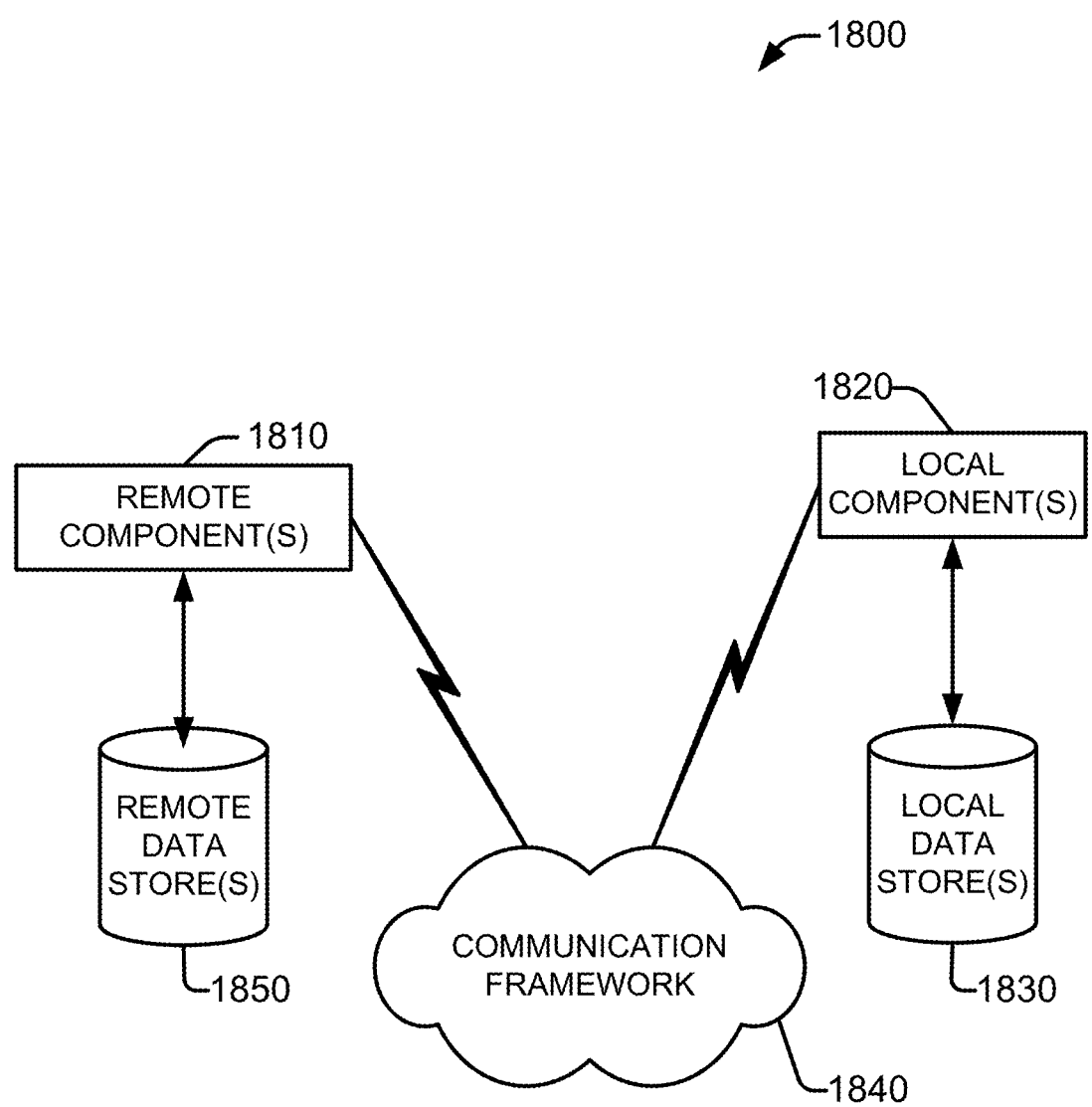
FIG. 18 illustrates a block diagram of an example operating environment into which embodiments of the subject matter described herein can be incorporated.

FIG. 18 is a schematic block diagram of an operating environment 1800 with which the described subject matter can interact. The operating environment 1800 comprises one or more remote component(s) 1810. The remote component(s) 1810 can be hardware and/or software (e.g., threads, processes, computing devices). In one or more embodiments, remote component(s) 1810 can be a distributed computer system, connected to a local automatic scaling component and/or programs that use the resources of a distributed computer system, via communication framework 1840. Communication framework 1840 can comprise wired network devices, wireless network devices, mobile devices, wearable devices, radio access network devices, gateway devices, femtocell devices, servers, etc.

The operating environment 1800 also comprises one or more local component(s) 1820. The local component(s) 1820 can be hardware and/or software (e.g., threads, processes, computing devices). In one or more embodiments, local component(s) 1820 can comprise an automatic scaling component and/or programs that communicate/use the remote resources 1810 and 1820, etc., connected to a remotely located distributed computing system via communication framework 1840.

One possible communication between a remote component(s) 1810 and a local component(s) 1820 can be in the form of a data packet adapted to be transmitted between two or more computer processes. Another possible communication between a remote component(s) 1810 and a local component(s) 1820 can be in the form of circuit-switched data adapted to be transmitted between two or more computer processes in radio time slots. The operating environment 1800 comprises a communication framework 1840 that can be employed to facilitate communications between the remote component(s) 1810 and the local component(s) 1820, and can comprise an air interface, e.g., interface of a UMTS network, via a long-term evolution (LTE) network, etc. Remote component(s) 1810 can be operably connected to one or more remote data store(s) 1850, such as a hard drive, solid state drive, SIM card, device memory, etc., that can be employed to store information on the remote component(s) 1810 side of communication framework 1840. Similarly, local component(s) 1820 can be operably connected to one or more local data store(s) 1830, that can be employed to store information on the local component(s) 1820 side of communication framework 1840.

Example Computing Environment

Figure 19:
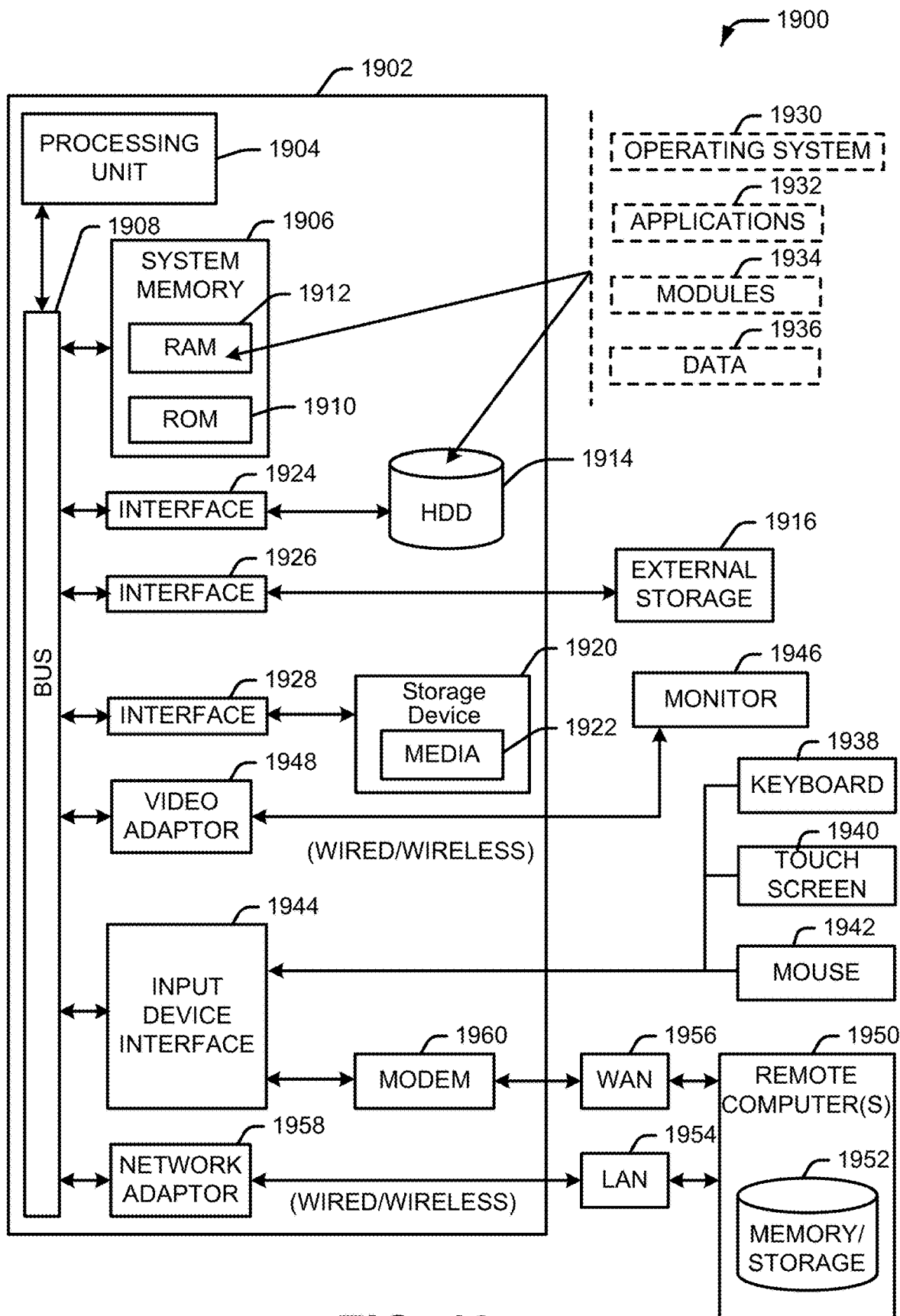
FIG. 19 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 19, the example computing environment 1900 which can implement one or more embodiments described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a nonvolatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), and can include one or more external storage devices 1916 (e.g., a magnetic floppy disk drive (FDD) 1916, a memory stick or flash drive reader, a memory card reader, etc.). While the internal HDD 1914 is illustrated as located within the computer 1902, the internal HDD 1914 can also be configured for external use in a suitable chassis (not shown). Additionally, while not shown in computing environment 1900, a solid state drive (SSD) could be used in addition to, or in place of, an HDD 1914.

Other internal or external storage can include at least one other storage device 1920 with storage media 1922 (e.g., a solid state storage device, a nonvolatile memory device, and/or an optical disk drive that can read or write from removable media such as a CD-ROM disc, a DVD, a BD, etc.). The external storage 1916 can be facilitated by a network virtual machine. The HDD 1914, external storage device(s) 1916 and storage device (e.g., drive) 1920 can be connected to the system bus 1908 by an HDD interface 1924, an external storage interface 1926 and a drive interface 1928, respectively.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. The network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   implementing, by a system comprising a processor, an exclusive lock in a lock domain that identifies a data structure representative of a system B-tree (SBT) of an SBT system;
   updating, by the system, an SBT generation number associated with the SBT, resulting in a first version of the SBT generation number;
   executing, by the system, in response to execution of a lock loss call back at the SBT, a comparison of the first version of the SBT generation number with a second version of the SBT generation number to determine a change of version of the SBT generation number; and identifying, by the system, a work assignment associated with the change of version of the SBT generation number.

2. The method of claim 1, further comprising:

generating, by the system, a notification that the work assignment has been selected for execution by a claiming entity.

3. The method of claim 1, further comprising:

updating, by the system, the first version of the SBT generation number to the second version of the SBT generation number in response to insertion of the work assignment into the data structure representative of the SBT.

4. The method of claim 1, further comprising:

releasing, by the system, an exclusive lock in the lock domain causing the execution of the lock loss call back at the SBT.

5. The method of claim 1, further comprising:

enabling subscription, by the system, by a client entity to the SBT; and enabling observation, by the system, by the client entity of the data structure representative of the SBT for any change of version of the SBT generation number associated with the SBT.

6. The method of claim 5, further comprising:

in response to the change of version of the SBT generation number, flashing, by the service manager, a lock associated with the SBT;

storing, by the service manager, second information in the data structure, wherein the second information is representative of a status associated with the work assignment; and comparing, by the service manager, the second information with first information having already been obtained regarding the work assignment.

7. The method of claim 6, further comprising:

generating, by an evaluator of the system, a log of progress of the work assignment, based on the second information and the first information, wherein the log is disposed external to the SBT system.

8. The method of claim 1, further comprising:

subscribing, by an evaluator of the system, to the SBT;

observing, by the evaluator, the data structure representative of the SBT for any change of version of the SBT generation number associated with the SBT;

obtaining, by the evaluator, an exclusive lock associated with the SBT; and marking, by the evaluator, in the data structure representative of the SBT, the work assignment as expired.

9. A system, comprising:

a processor, and a memory that stores executable instructions that, when executed by the processor, facilitate performance of operations, comprising:

obtaining information associated with a work assignment that is available for execution;

writing data to an envelope of a leaf, of a system B-tree (SBT) of an SBT system, comprising the information associated with the work assignment, wherein the envelope is comprised by a cache associated with the leaf, and wherein the writing data to the envelope comprises updating an SBT generation number associated with the leaf; and generating a notification that the work assignment is available.

10. The system of claim 9, wherein the operations further comprise:

monitoring the SBT system for changes to SBT generation numbers associated with the SBTs; and identifying a change in the SBT generation number of the SBT generation numbers.

11. The system of claim 10, wherein the operations further comprise:

flashing a lock associated with the leaf; and in response to flashing the lock, obtaining read access to the leaf.

12. The system of claim 9, wherein the operations further comprise:

making a configuration change comprising indicating, at the envelope, that the work assignment has been claimed.

13. The system of claim 9, wherein the writing the data to the envelope comprises writing the data as a key/value pair.

14. The system of claim 13, wherein higher order bytes of the key/value pair comprise a device identifier (ID) of a node being addressed by the work assignment, and wherein lower order bytes of the key/value pair comprise the SBT generation number.

15. The system of claim 9, wherein the operations further comprise:

monitoring states of work assignments associated with the SBT system, comprising the work assignment; and based on the monitoring, generating a log of work assignments, wherein the log is accessible external to the SBT system.

16. The system of claim 15, wherein the operations further comprise:

flashing a lock associated with one of the SBTs that is associated with a failed work assignment, other than the work assignment; and marking the failed work assignment as expired at a respective envelope of the one of the SBTs that is associated with the failed work assignment.

17. A non-transitory machine-readable medium, comprising executable instructions that, when executed by a processor facilitate performance of operations, comprise:

based on a subscription to a system B-tree (SBT) of an SBT system, monitoring the SBT for a change to a generation number associated with the SBT; and assigning a work assignment to a work node based on determining that the change to the generation number associated with the SBT has occurred.

18. The non-transitory machine-readable medium of claim 17, wherein the operations further comprise:

caching information from the SBT associated with the work assignment in response to the determining that the change to the generation number associated with the SBT has occurred.

19. The non-transitory machine-readable medium of claim 17, wherein the operations further comprise:

in response to determining that the change to the generation number associated with the SBT has occurred, flashing a lock associated with the SBT and subsequently reading information of a key/value pair associated with the work assignment.

20. The non-transitory machine-readable medium of claim 19, wherein first bytes of a first order of the key/value pair comprise a device ID of a node being addressed by the work assignment and second bytes of a second order of the key/value pair comprise a generation number of the SBT.

* * * * *